United States Patent [19]
Pasternak et al.

[11] Patent Number: 5,936,949
[45] Date of Patent: Aug. 10, 1999

[54] WIRELESS ATM METROPOLITAN AREA NETWORK

[75] Inventors: Eliezer Pasternak; Gideon Ben-Efraim, both of Palo Alto; Stuart M. Feeney, Cupertino, all of Calif.

[73] Assignee: Netro Corporation, San Jose, Calif.

[21] Appl. No.: 08/708,593

[22] Filed: Sep. 5, 1996

[51] Int. Cl.⁶ .................................................. H04L 12/28
[52] U.S. Cl. ........................... 370/328; 370/338; 370/395
[58] Field of Search ..................................... 370/328, 337, 370/338, 347, 348, 349, 395

[56] References Cited

U.S. PATENT DOCUMENTS

| | | | |
|---|---|---|---|
| 4,792,946 | 12/1988 | Mayo | 370/86 |
| 5,155,726 | 10/1992 | Spinney et al. | 370/85.5 |
| 5,161,194 | 11/1992 | Ujiie | 380/48 |
| 5,214,648 | 5/1993 | Lespagnol et al. | 370/94.1 |
| 5,230,002 | 7/1993 | Yamashita et al. | 371/37.1 |
| 5,258,762 | 11/1993 | Cabon et al. | 342/42 |
| 5,260,978 | 11/1993 | Fleischer et al. | 375/106 |
| 5,379,116 | 1/1995 | Wada et al. | 358/431 |
| 5,404,374 | 4/1995 | Mullins et al. | 375/200 |
| 5,412,660 | 5/1995 | Chen et al. | 370/110.1 |
| 5,426,442 | 6/1995 | Haas | 343/778 |
| 5,434,853 | 7/1995 | Hemmady et al. | 370/60 |
| 5,475,677 | 12/1995 | Arnold et al. | 370/280 |
| 5,490,144 | 2/1996 | Tran et al. | 370/85.3 |
| 5,499,243 | 3/1996 | Hall | 370/85.8 |
| 5,534,937 | 7/1996 | Zhu et al. | 348/466 |
| 5,557,621 | 9/1996 | Nakano et al. | 371/37.1 |
| 5,563,887 | 10/1996 | Harasaki | 370/94.1 |
| 5,572,517 | 11/1996 | Safadi | 370/50 |
| 5,648,958 | 7/1997 | Counterman | 370/458 |
| 5,648,969 | 7/1997 | Pasternak et al. | 370/349 |
| 5,710,756 | 1/1998 | Pasternak et al. | 370/216 |
| 5,717,689 | 2/1998 | Ayanoglu | 370/349 |

FOREIGN PATENT DOCUMENTS

| | | | |
|---|---|---|---|
| 195 35 329 | 3/1997 | Germany | H04B 7/26 |
| 195 36 379 | 4/1997 | Germany | H04B 7/26 |

OTHER PUBLICATIONS

Raychaudhuri, et al., "WATMnet: Prototype Wireless ATM System for Multimedia Personal Communication", IEEE Journal On Selected Areas In Communications, vol. 15, No. 1, pp. 83–95 (Jan. 1997).

Chang, et al., "Guaranteed Quality–of–Service Wireless Access to ATM Networks", IEE Journal On Selected Areas In Communications, vol. 15, No. 1, pp. 106–118 (Jan. 1997).

Raychaudhuri, et al., "ATM–Based Transport Architecture for Multiservices Wireless Personal Communication Networks", IEEE Journal on Selected Areas in Communications, vol. 12, No. 8, pp. 1401–1414 (Oct. 1992).

Rifaat A. Dayem, "Appendix C. Random medium Access Control Techniques", Mobile Data & Wireless Lan Technolgies, pp. 257–261 (1997).

(List continued on next page.)

*Primary Examiner*—Melvin Marcelo
*Attorney, Agent, or Firm*—Skjerven, Morrill, MacPherson, Franklin and Friel; Alan H. MacPherson; Fabio E. Marino

[57] ABSTRACT

The present invention provides an efficient point-to-multipoint microwave ATM network including a base station (BS) broadcasting a continuous transmission with a sector antenna. The system uses time division multiplex (TDM) for downstream transmission and time division multiple access (TDMA) for upstream transmission. The downstream transmission consists of ATM cells encapsulated in MAC protocol data units (PDUs) for forward error correction (FEC) and synchronization. Small Subscriber Terminals (STs), including Subscriber Radio Units (SRUs), receive the broadcast and pass it to a Subscriber Access System (SAS) that drops the ATM cells addressed only to them. To allow strong FEC protection and to maintain the same symbol rate as the downstream transmission without sacrificing bandwidth, a modified trellis code modulation technique, which incorporates Reed Solomon coding, is used during upstream transmission.

13 Claims, 22 Drawing Sheets

OTHER PUBLICATIONS

Rosberg, Zvi, "Cell Multiplexing in ATM Networks", IEEE/ACM Transactions on Networking, vol. 4, Issue 1, pp. 112–122, Feb. 1996.

Tsle, K.Y. et al.,"Performance Comparison of High Level Modulation Techniques For Land Mobile Communications," IEE Colloquim on Advanced Modulation and Channel Coding Techniques for Mobile and Personal Communications (Digest No. 206), pp. 3/1–3/6, Nov. 1992.

Lau, R. C. et al., "Synchronous Techniques for Timing Recovery in BISDN," GLOBECOM '92, IEEE Global Telecommunications Conference (Cat. No. 92CH3130–2), vol. 2, pp. 814–820, Dec. 1992.

Xie, H. et al., "Data Link Central Protocols for Wireless ATM Access Channels," 1995 Fourth IEEE International Conference on Universal Personal Communications, Gateway to the 21st Century (Cat. No. 95TH8128), pp. 753–757, Nov. 1995.

Horneffer, M. et al., "Directed Antennas in the Mobile Broadband System," Proceedings IEEE INFOCOM '96, Networking the Next Generation (Cat. No. 96CB35887), vol. 2, pp. 704–712, Mar. 1996.

Falconer, David, "A System Architecture for Broadband Millimeter–Wave Access to an ATM LAN," IEEE Personal Communications, vol. 3, Iss. 4, pp. 36–41, Aug. 1996.

Raychaudhuri, Dipankar, "Wireless ATM Networks: Architecture, System Design and Prototyping," IEEE Personal Communications, vol. 3, Iss. 4, pp. 42–49, Aug. 1996.

Walke, B. et al., "Wireless ATM: Air Interface and Network Protocols of the Mobile Broadband System," IEEE Personal Communications, vol. 3, Iss. 4, pp. 50–56, Aug. 1996.

FDM Structure

SRU Cross Section

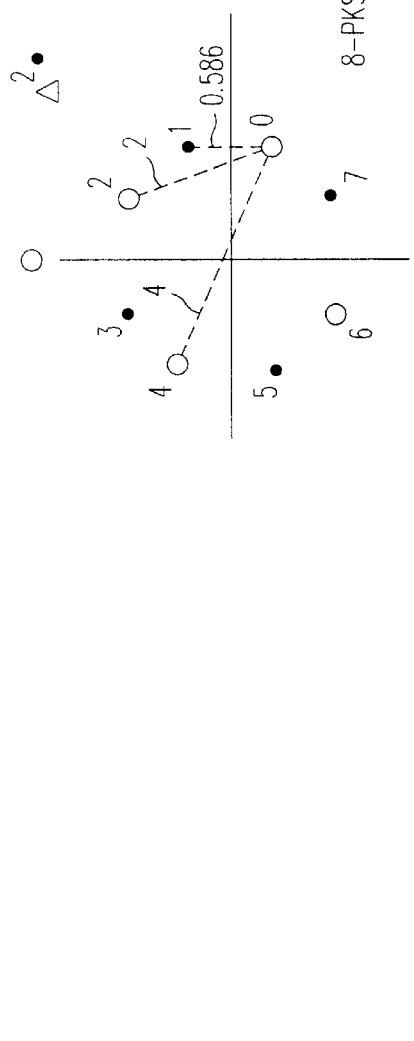
FIG. 8 8-PKS Constellation Diagram
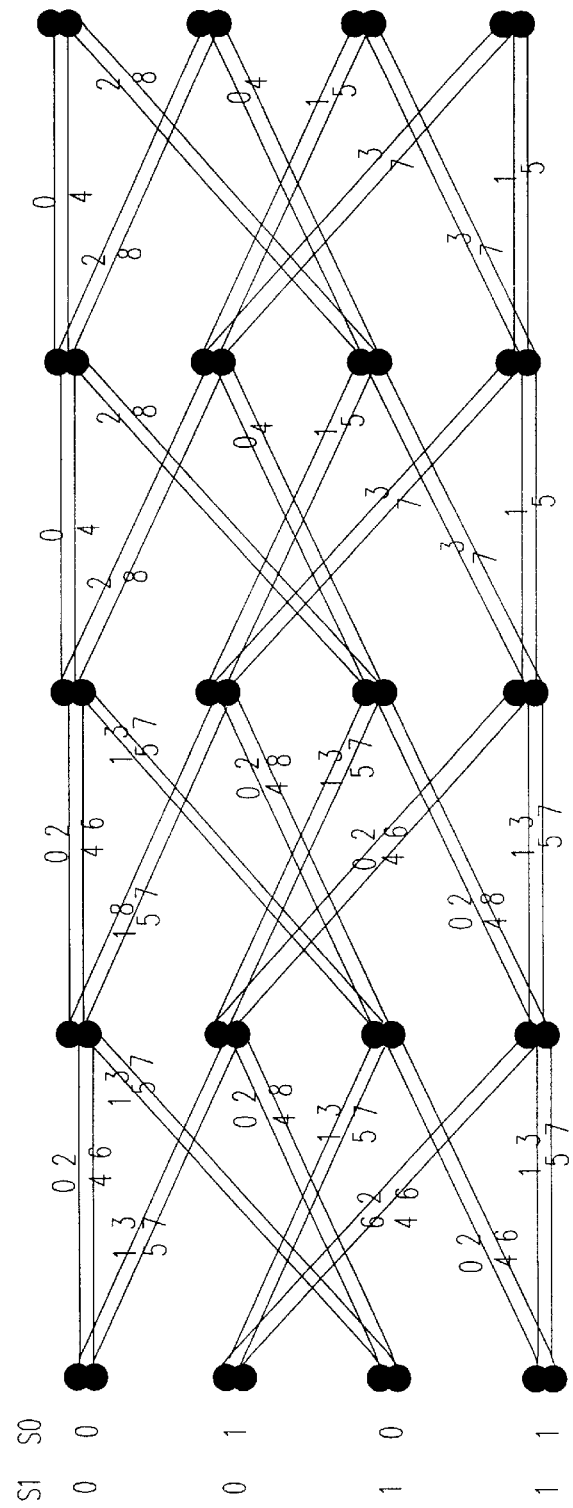
FIG. 9 Modem encoder Trellis diagram Wireless Air Interface Reference Model

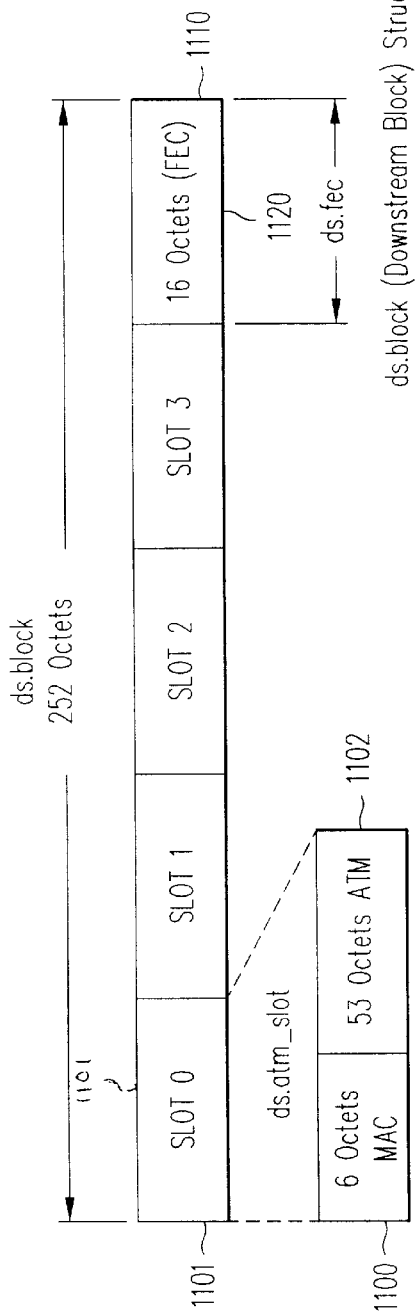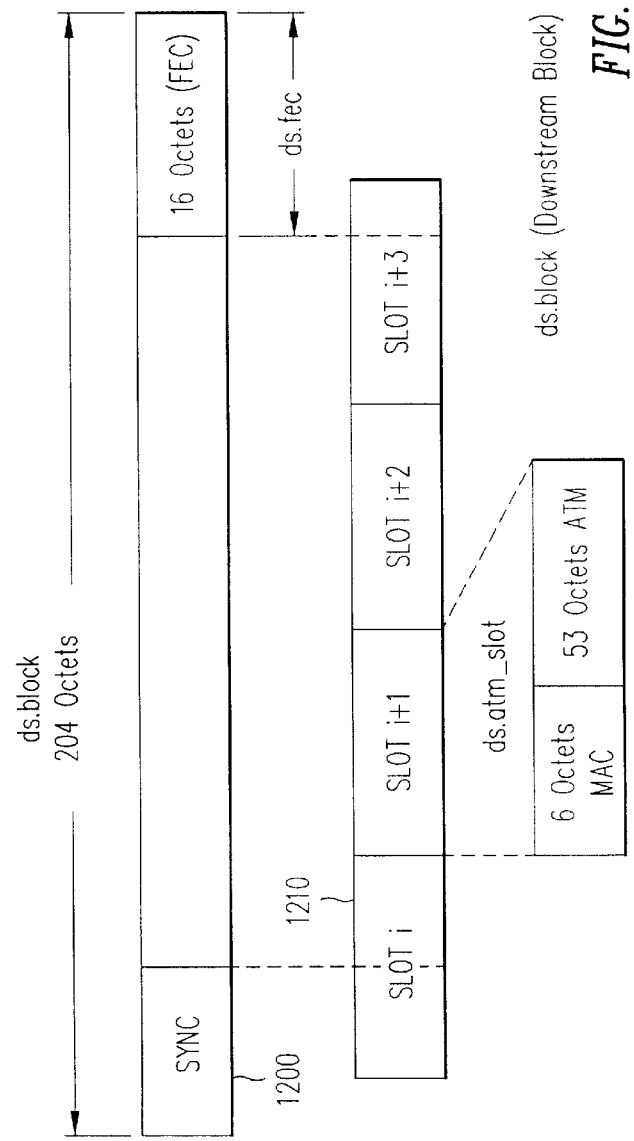
FIG. 11
FIG. 12 us.atm_slot Structure

MAC timing relationship

Admission request format

Bitmap Slot Structure

The CellMAC SAPs model

ATM cell transmission requested by CellMAC

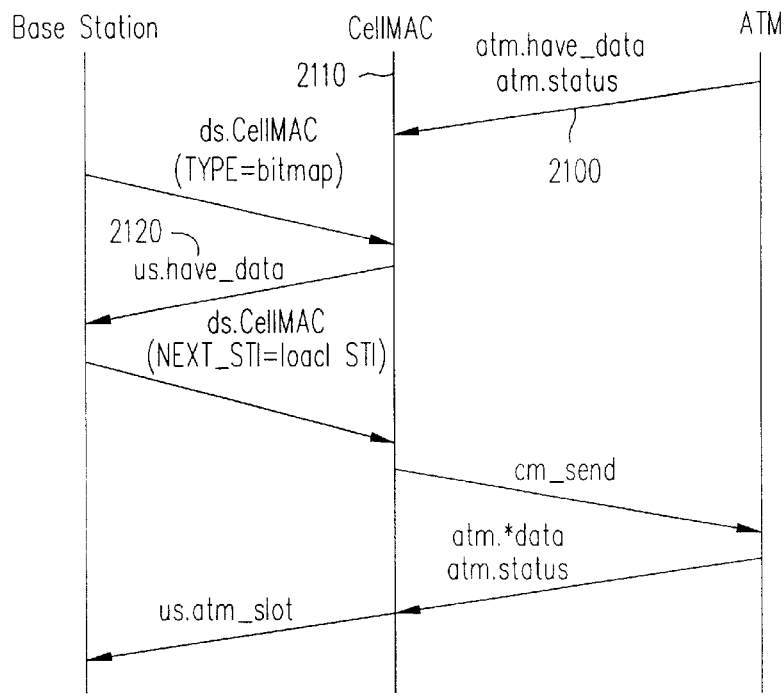
FIG. 21 ATM cell transmission requested by ATM layer – bitmap available
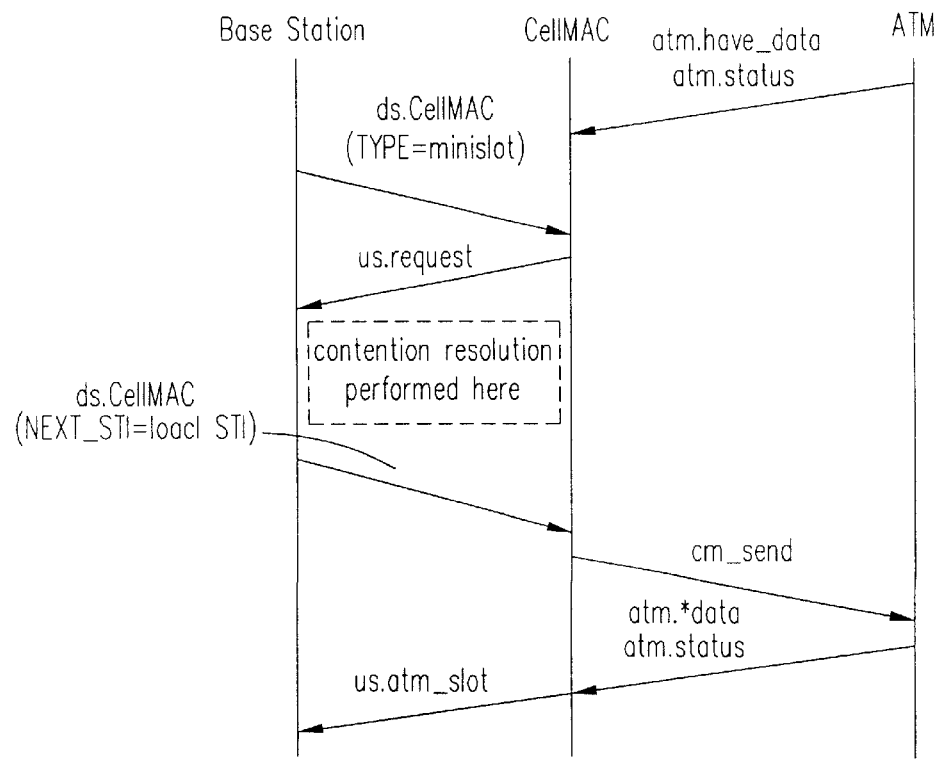
FIG. 22 ATM cell transmission requested by ATM layer by a minislot contention Parallel Cell Transfer Roll-off interference MAC Control at Base Station Controller

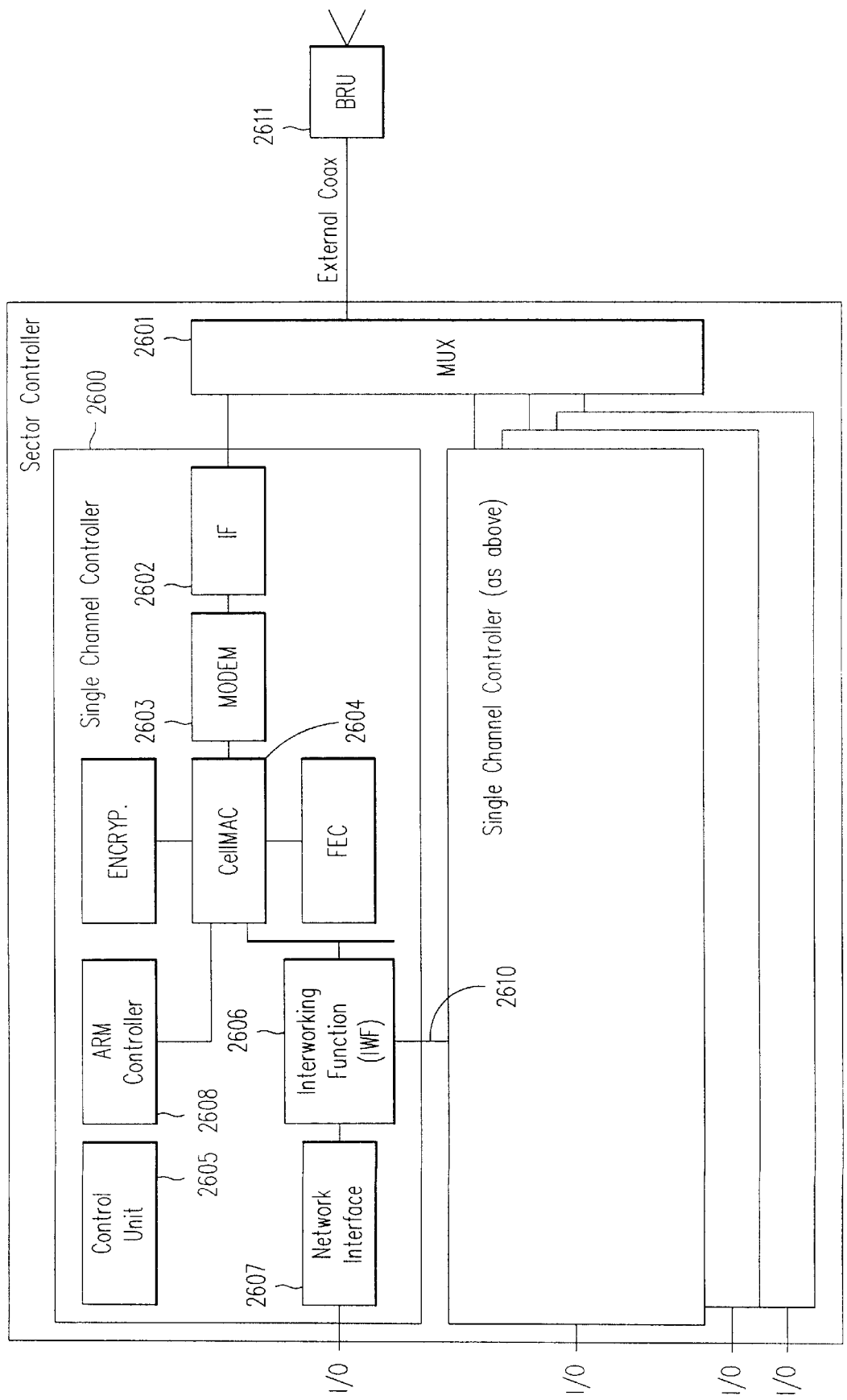
FIG. 26  Base Station Controller Block Diagram

Vertical radiation pattern effects

The Base Station Antenna

FIG. 30 Coverage Map with one pair of frequencies

Symmetrical cellular arrangement with three transmitting channels

WIRELESS ATM METROPOLITAN AREA NETWORK

FIELD OF THE INVENTION

This invention relates to the field of telecommunication networks and packet switching and, in particular, to providing radio-based point-to-multipoint for cell-switched networks.

BACKGROUND

The Asynchronous Transfer Mode (ATM) method of transmitting and switching multimedia information is replacing older circuit and packet switching techniques, allowing flexible, fast and cost effective provision of new telecommunications service. Among these services are Internet access, Basic rate ISDN, fractional T1/E1 support of cellular PCN network and LAN traffic routing.

These services require expensive infrastructure of transmission facilities, such as copper lines, fiber optics, cable TV or hybrid fiber-coax (HFC). In a competitive environment in which some new telecommunication service providers own some or none of the above facilities, wireless is the other alternative for timely and cost effective deployment of transmission networks. Two previous patent applications (application Ser. No. 08/388,110 filed Feb. 13, 1995 now U.S. Pat. No. 5,648,969 and application Ser. No. 08/538,327 filed Oct. 3, 1995 now U.S. Pat. No. 5,710,756 both assigned to the same assignee and both incorporated herein by reference in their entirety) disclose the structure of reliable networks based on point-to-point radio links. These links allow reliable transmission of ATM traffic with minimum link errors and ATM cell misinsertion. These links are cost effective for high bandwidth and continuous transmission. However, these systems make bad use of equipment and spectrum for applications of intermittent nature such as telephone calls over a wireless link. When a telephone is on hook, the spectrum should be freed for other potential users, and so should the central office transceiver that served that telephone. Data traffic does not always follow the behavior of voice calls. Data may flow slowly, requiring low baud rate for transmission, followed suddenly by a burst of high speed traffic. For efficient use of spectrum, it is desired to allocate bandwidth on demand in a fast and efficient way to handle such bursty information.

These requirements can be served by a multiple access network that uses ATM cells to emulate the variety of services, and by the use of a media access control (MAC) protocol to arbitrate the transfer of data over the air.

ATM services include Constant Bit Rate (CBR), suitable for telephony and video, Variable Bit Rate (VBR), suitable for video applications with variable compression, Available Bit Rate (ABR) suitable for data transactions, and Unspecified Bit Rate (UBR), suitable for e-mail or other non-delay sensitive applications. A MAC layer must support efficiently all of these services.

Due to the high bandwidth required for serving many customers with varying bit rate requirements, high total bandwidth is required in such links. This bandwidth is available only at high microwave frequencies, usually in the range of 10—40 GHz.

The economy of point-to-multipoint systems favors delegating as many functions as possible to the base station ("point") serving the subscriber terminals ("multi-point"), thus saving the cost of replicating the same function in all terminals.

There is, therefore, a need for a point-to-multipoint wireless metropolitan area network with MAC layer suitable for a variety of ATM services, operating at microwave frequencies and allowing cost-effective subscriber radio terminals.

SUMMARY OF THE INVENTION

This invention provides an efficient point-to-multipoint microwave ATM network (sometimes called a "system"). A base station (BS) broadcasts a continuous transmission with a sector antenna. The system uses time division multiplex (TDM) for downstream transmission (from base to subscribers) and time division multiple access (TDMA) for upstream transmission. Existing TDMA protocols, such as those used in HFC applications, use a periodic frame with time slot numbers to indicate who can transmit. This technique is suitable for telephony applications where each voice call occupies a fixed bandwidth, i.e. a fixed number of slots. This technique suffers a major drawback when used in ATM applications. Some ATM CBR rates have periods which are different from other CBR services, that are non suitable for a TDM frame. With different periods, there may be no common frame period to fit all. Eventually, either ATM cells will have to be dropped when their timings coincide, or the ATM network will not admit connections with such conflicts, resulting in low bandwidth utilization. In accordance with this invention, ATM cell transmissions in the upstream direction are granted on a cell by cell basis. If two upstream cells coincide, one is shifted slightly in time, causing small cell delay variation (CDV) which is preferable to losing that cell. The downstream transmission consists of ATM cells encapsulated in MAC protocol data units (PDUs) and other overhead bits used for forward error correction (FEC) and synchronization. Small Subscriber Terminals (STs), including Subscriber Radio Units (SRUs), receive that broadcast and pass it to a Subscriber Access System (SAS) that drops the ATM cells addressed only to them. Each MAC PDU transmitted by the BS may include a grant for a specific ST. The grant specifies which ST is allowed to transmit but not which time slot. The time slot of transmission is implicit in that the time slot is simply a fixed number of time slots from the grant reception event.

The upstream transmission includes single ATM cells with their MAC and physical layer overhead. To allow strong FEC protection and to maintain the same symbol rate as the downstream transmission without sacrificing bandwidth, a modified trellis code modulation technique is used. Trellis code modulation includes transmission of redundant code bits for error correction. In accordance with this invention, the trellis code rate is increased, causing it to weaken its noise immunity, i.e. more bits are excluded from the trellis code overhead. For example, the code rate is increased to 5/6 from 2/3, meaning 5 out of 6 bits are data and only one out of 6 is trellis code overhead. However this weakening is more than compensated for by using the extra bits for Reed Solomon coding. The combined concatenated code has better noise immunity then a TCM code alone (at a lower code rate), yet they both use the same symbol rate and the same payload.

The Subscriber Radio Units (SRUs) are simplified in design by having them phase locked to the Base Station carrier. In accordance with this invention, the transmit signal frequency is phase locked with a frequency offset to the original signal, thus the phase noise remains almost as low as that to the expensive base station microwave synthesizer.

To provide high antenna gain and low cost, an integral lens-horn antenna is used in the SRU. The base station uses a horn antenna that in accordance with this invention includes adjustable beam width by use of absorption plates and an extended main radiation lobe in the vertical dimension by use of a lens or a geometry with intentional phase plane deviation.

The ATM traffic gathered from the STs is optionally shaped by a cell jitter attenuator to reduce cell delay variation (CDV) occurring over the link. The Base Sector Controller (BSC) includes the master MAC controller and application-specific processing circuits and software. In the case of supporting basic rate ISDN services, the BSC includes an interworking function that converts individual circuits-emulation ATM cells from each ST to a combined emulated T1 or E1 line with embedded signaling according to V5.1 or V5.2 protocols. This signal can then be combined with similar signals from other BSCs, if desired by an external ATM switch. The combined signals travel via the ATM backbone network until they reach a site with an ISDN central office switch. The signals are then transferred by the ATM switch at that site to a physical T1/E1 line that can be connected to the ISDN switch or other equipment.

This invention will be more fully understood in conjunction with the following detailed description taken together with the drawings.

BRIEF DESCRIPTION OF THE DRAWINGS

FIG. 8 is a phasor diagram showing a constellation of 8-PSK modulation.

FIG. 9 is a modem TCM trellis diagram with rate ⅚.

FIG. 11 shows a downstream ds.block MAC primitive.

FIG. 12 shows another embodiment of the ds.block primitive with a floating payload structure.

FIG. 21 shows ATM cell transmission originating from the ATM layer at the subscriber terminal if bitmap reservation is available.

FIG. 22 shows the same transmission as in FIG. 21 but with contention reservation.

FIG. 26 shows a block diagram of a base station controller.

DEFINITION OF ACRONYMS

Note: Netro-specific terms use BOLD ITALIC characters.

AAL ATM Adaptation Layer
ABR Available Bit Rate, an ATM service in which the source rate may change during a connection wherein cell delay variation is not specified.
AGC Automatic Gain Control
ARM Adaptive Radio-Resource Management
ARQ Automatic Retransmit Request
ATM Asynchronous Transfer Mode
BPSK Bipolar Phase Shift Key
BRU Base Station Radio Unit
BS Base Station
BSC Base Station Sector Controller
CBR Constant Bit Rate—an ATM service with guaranteed rate of transport and cell delay variation.
CDV Cell (ATM) Delay Variation
DC Direct Current
DRO Dielectric Resonant Oscillator
DVB Digital Video Broadcast
E1 European digital line interface at 2.048 Mbps.
E2 European digital line interface at 8.448 Mbps.
E3 European digital line interface at 34.368 Mbps.
EPROM Erasable Programmable Read-Only Memory
EEPROM Electrically-Erasable Programmable Read-Only Memory
FDD Frequency Division Duplex
FPGA Field Programmable Gate Array
FEC Forward Error Correction
HEC Header Error Control
HFC Hybrid Fiber Coax
ID Identification
IP Internet Protocol
ISDN Integrated Services Digital Network
LAN Local Area Network
LED Light Emitting Diode
LNA Low Noise Amplifier
MAC Media Access Control
Mbps Mega bits per second
MMIC Monolithic Microwave Integrated Circuit
NMS Network Management System
P-MP Point to multipoint
PBX Private Branch Exchange, a generic term for a voice switch.
PCN Personal Communication Networks—A mobile telephone service type.

PCS Personal Communication Services—A mobile telephone service.
PDU Protocol Data Unit—the payload field of a protocol packet.
PN Pseudo Noise
PSK Phase Shift Keying
PROM Programmable Read-Only Memory
PTT Post Telephone and Telegraph, a common name for government service providers
QPSK Quadrature Phase Shift Keying
RISC Reduced Instruction Set Computer
RS Reed Solomon (a block error correction code)
RU Radio Unit
SAP Service Access Point
SAPI Service Access Point Identifier
SAS Subscriber Access System—the indoor portion of a subscriber terminal
SRU Subscriber Radio Unit
ST Subscriber Terminal (SRU+SAS)
STI Subscriber Terminal Identifier
STM Synchronous Transfer Mode
TBD To be defined (later)
TCM Trellis Code Modulation—an error correction method based on encoding the transition of modulation symbols.
TDD Time Division Duplex—transmission and reception at same frequency alternating in time
TDM Time Division Multiplex
TDMA Time Division Multiple Access
Terminal A system consisting of SAS, SRU and the interconnections.
UBR Unspecified Bit Rate—an ATM service with no guaranteed rate, cell loss ratio or delay.
VBR Variable Bit Rate—an ATM service.
VC Virtual Circuit. In ATM cells is made of VPI/VCI.
VPI/VCI Virtual Path Identifier/Virtual Channel Identifier—an ATM address.
XOR Exclusive OR

DETAILED DESCRIPTION

Figure 1:
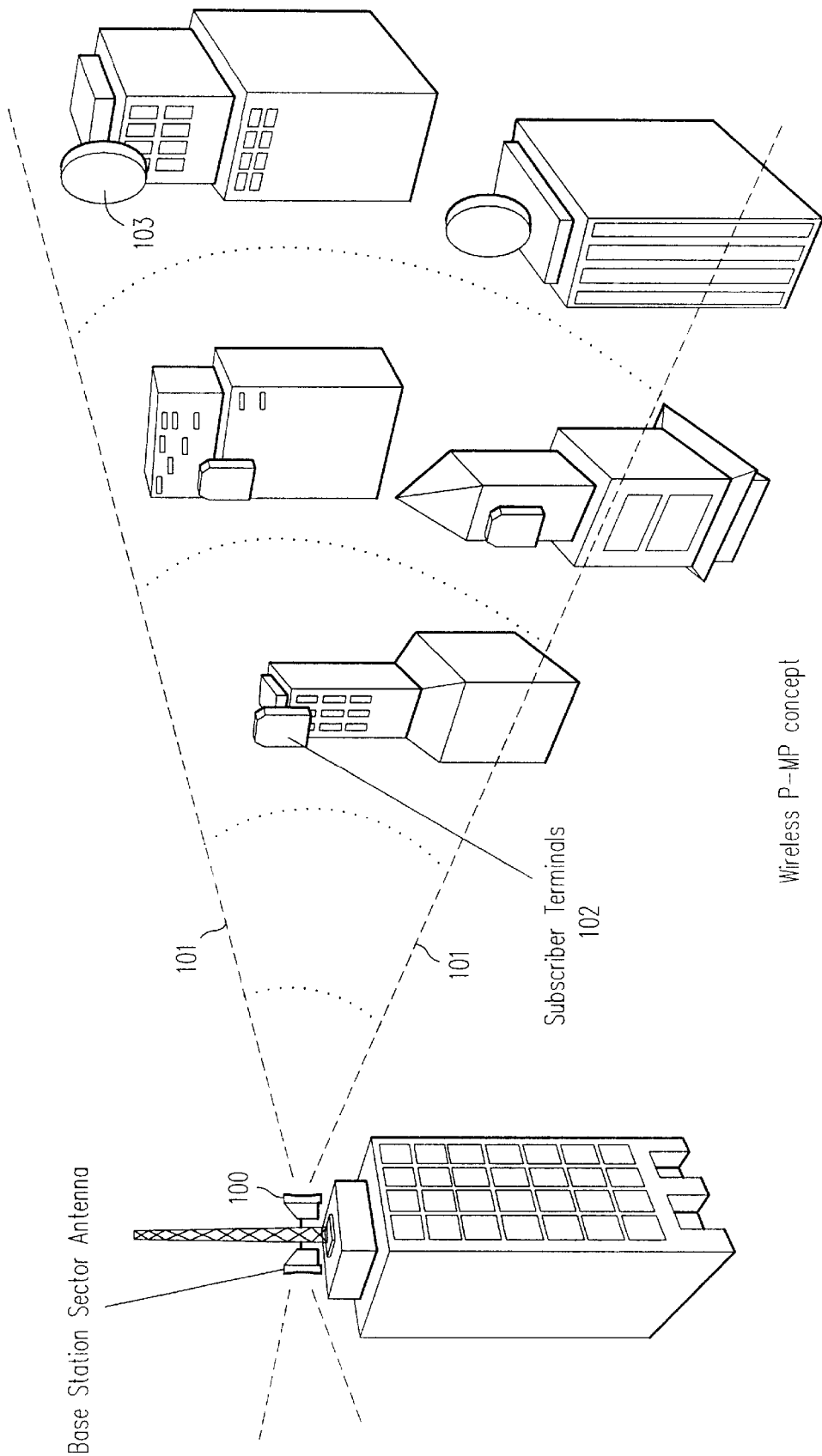
FIG. 1 shows a wireless point-to-multipoint (P-MP) network of a type suitable for use in a city.

A sector of a P-MP wireless transmission is shown in FIG. 1. A base station antenna 100 transmits to a sector 101 of 30 to 90 degrees. Subscribers wishing to get telecommunications services have subscriber terminals (STs) installed in their houses or offices. Nearby subscribers may install small outdoor radio units (SRUs)102. Those living far may install a parabolic antenna 103 attached to an SRU. A typical range of a metropolitan area network of this kind is 5 km. The angle of each sector is between 15 to 360 degrees.

Figure 2:
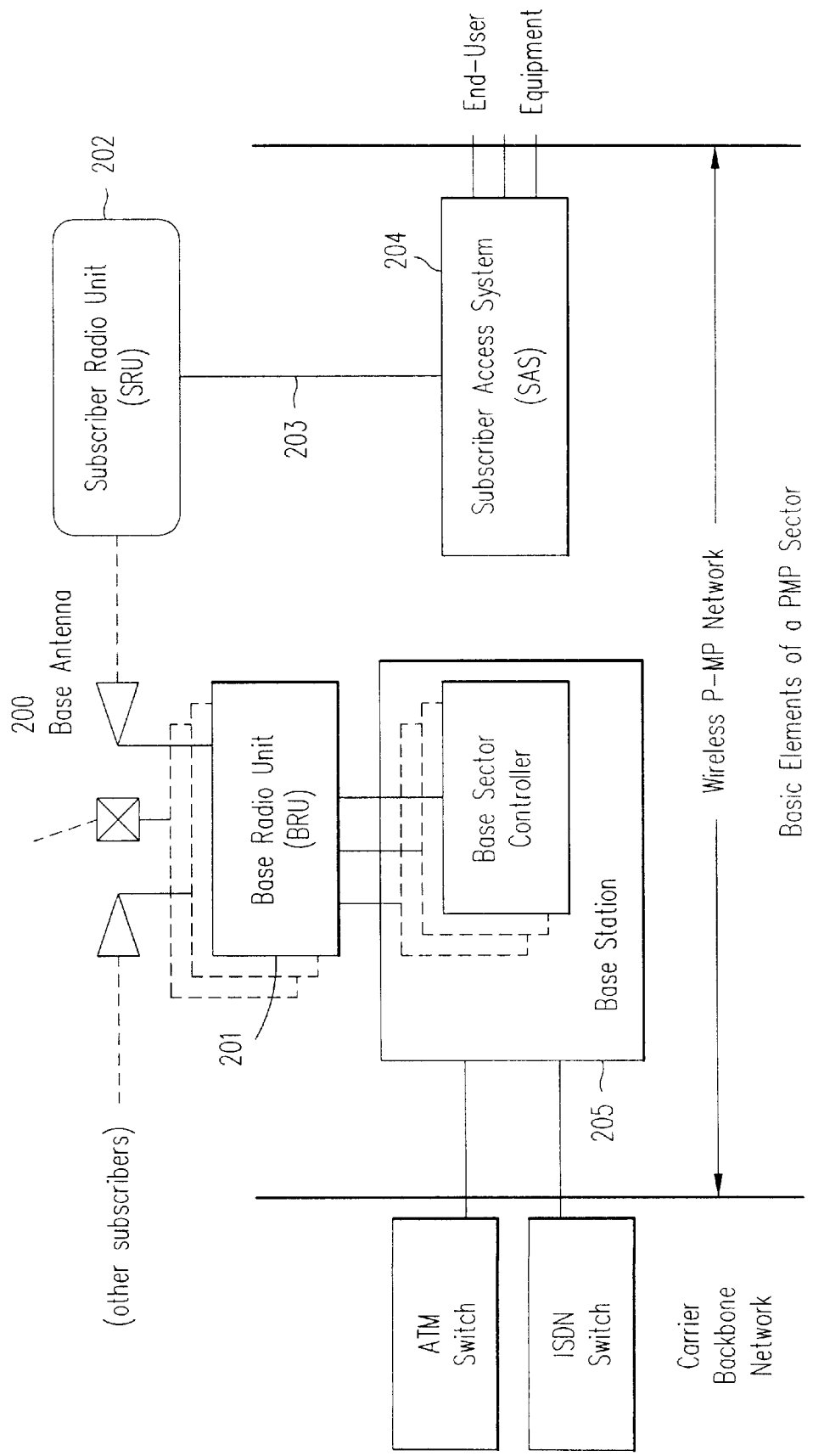
FIG. 2 shows the basic building blocks of a P-MP cell site.

The main building blocks of a P-MP network are shown in FIG. 2. Each sector antenna 200 is connected to a Base-Station Radio Unit (BRU) 201 that transmits and receives the radio frequency signals. The subscribers have Subscriber Radio Units (SRU) 202, connected by a coaxial cable 203 to a Subscriber Access System (SAS) 204 located typically indoors and attached to the user's equipment such as a telephone, computer, ATM switch or a micro-cellular telephone base station. The Base Station includes Base Sector Controllers (BSC), one per sector. The base station mediates between the service provider's backbone network, i.e. ATM network or ISDN network, and the subscribers terminals.

Figure 3:
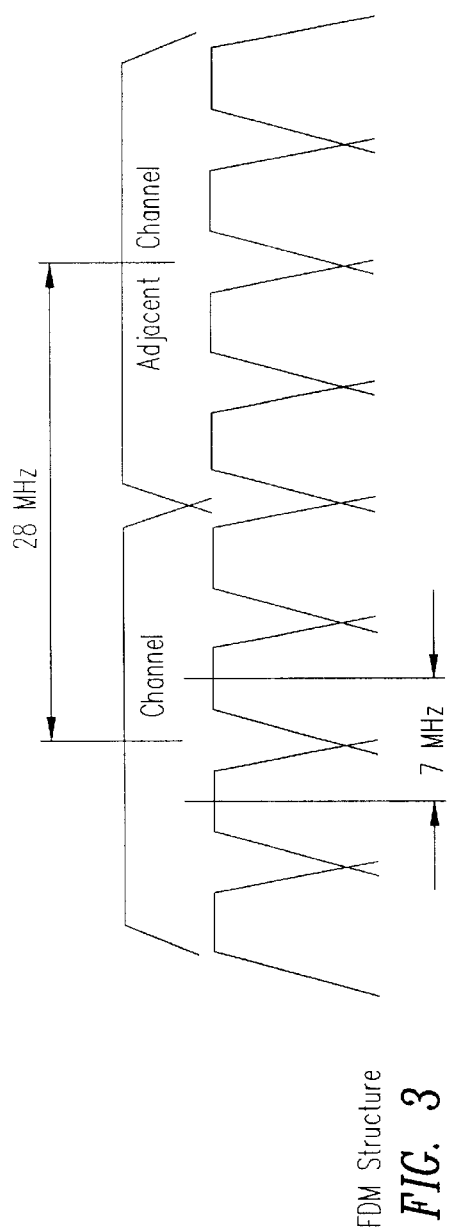
FIG. 3 shows an example of frequency division of the spectrum for transmission in a sector.

Each sector's spectral allocation may consist of multiple channels as depicted in FIG. 3. For example, a base station carrier may transmit at 25 GHz, occupying 28 MHz of channel width. However, the channel may be further divided into four 7 MHz sub channels so that low-cost STs will not have to transmit and receive at high speeds. The transmit-receive arrangement in this embodiment is based on frequency division duplex (FDD). For example, the base may transmit at 25 GHz and receive from the STs at 26 GHz. Other sectors may reverse role, having the BS transmit at 26 GHz. Each of the sub channels in turn is divided in the time domain. The downstream transmission is a time division multiplex (TDM) channel, essentially a broadcast to all STs tuned to this frequency, while the upstream transmission is a time division multiple access (TDMA), having the STs transmit in turn, as permission is granted from the BSC.

Figure 4:
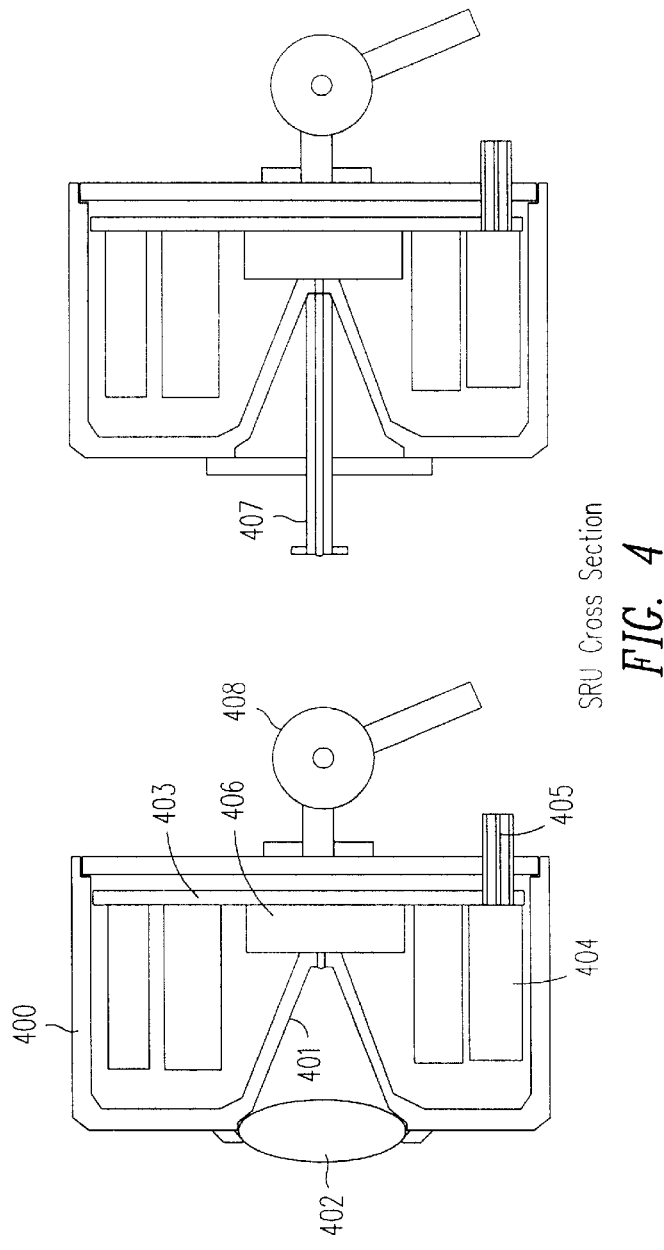
FIG. 4 shows a cross section of a Subscriber Radio Unit with a built-in lens-horn antenna and with a waveguide extension option for external antenna connection.

The SRU, shown in FIG. 4, is a small enclosure, roughly a shoe box size 400 with a built-in lens horn antenna. The horn 401 is conical or pyramidal. A dielectric lens 402 provides phase correction. The electronics is mounted on a motherboard 403 with various modules 404 attached. A coaxial connector 405 allows cable connection to the SAS. The horn 401 is fed directly from a diplexer 406 or via a coax/waveguide connection. If a larger antenna is desired, the SRU can be mounted in front of a parabolic reflector with the horn antenna serving as a feed; alternatively a waveguide adapter 407 may be installed to allow direct connection to a larger antenna. Mounting hardware similar to a flood light lamp pointing mechanism is used for alignment towards the base station antenna.

Figure 5A:
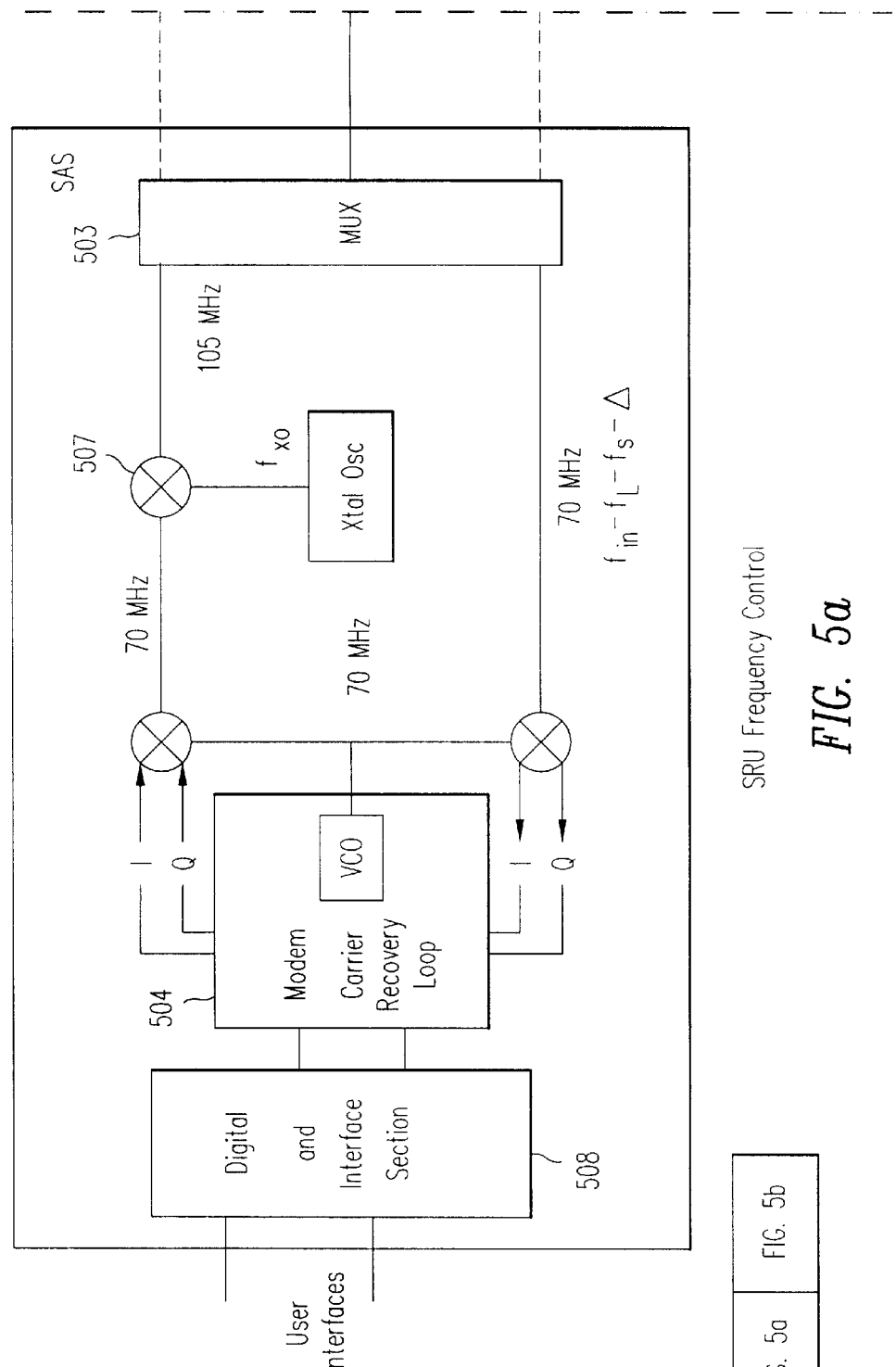
FIG. 5 shows a block diagram of the subscriber terminal with a focus on frequency control.
Figure 5B:
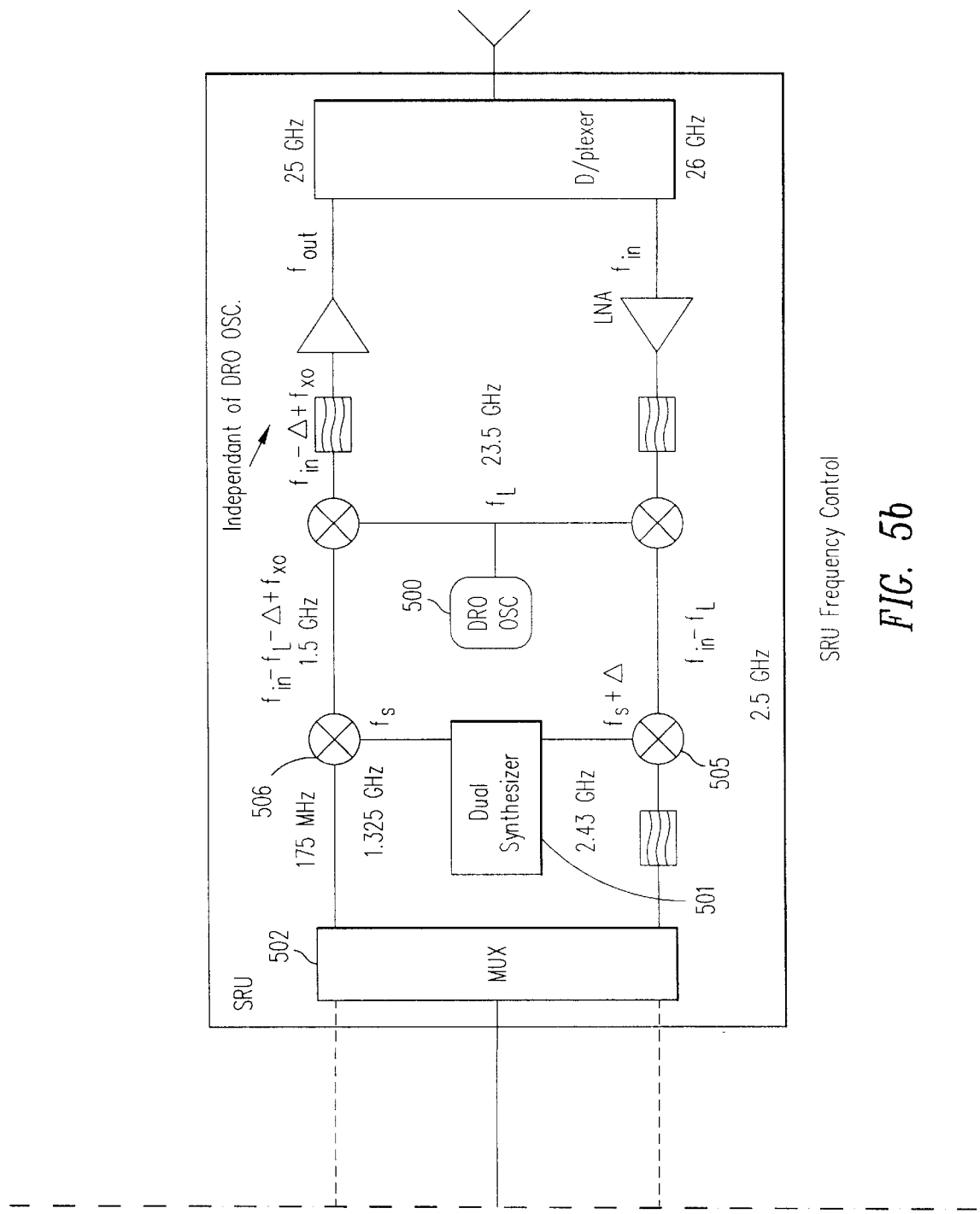

To reduce costs, the SRU does not have a microwave frequency synthesizer. Instead, it relies on the stable BRU frequency as a reference. As shown in FIG. 5, a free running DRO oscillator provides a rough microwave reference. By using dual conversion, a low frequency synthesizer 501 can create the desired offset frequency and fine tune the reception frequency. Examples of oscillator frequencies are shown in FIG. 5. A frequency multiplexer 502, 503 is used for combining all signals onto a single coaxial cable for convenient SAS to SRU connection. The modem recovers a precise carrier of 70 MHz that tracks the phase noise drift of the receive signal, caused mostly by the DRO 500, and uses this frequency for transmission. As shown by formulas at selected nodes of FIG. 5, the final transmitting frequency is independent of the DRO; therefore it cancels its phase noise. Another embodiment of this invention includes only one conversion, i.e. mixers 505, 506 are 507 are eliminated. Although the phase noise cancellation feature is lost in this case, the benefit is fewer spurious signals, the by-products of mixing and hence less filtering demands.

Figure 6:
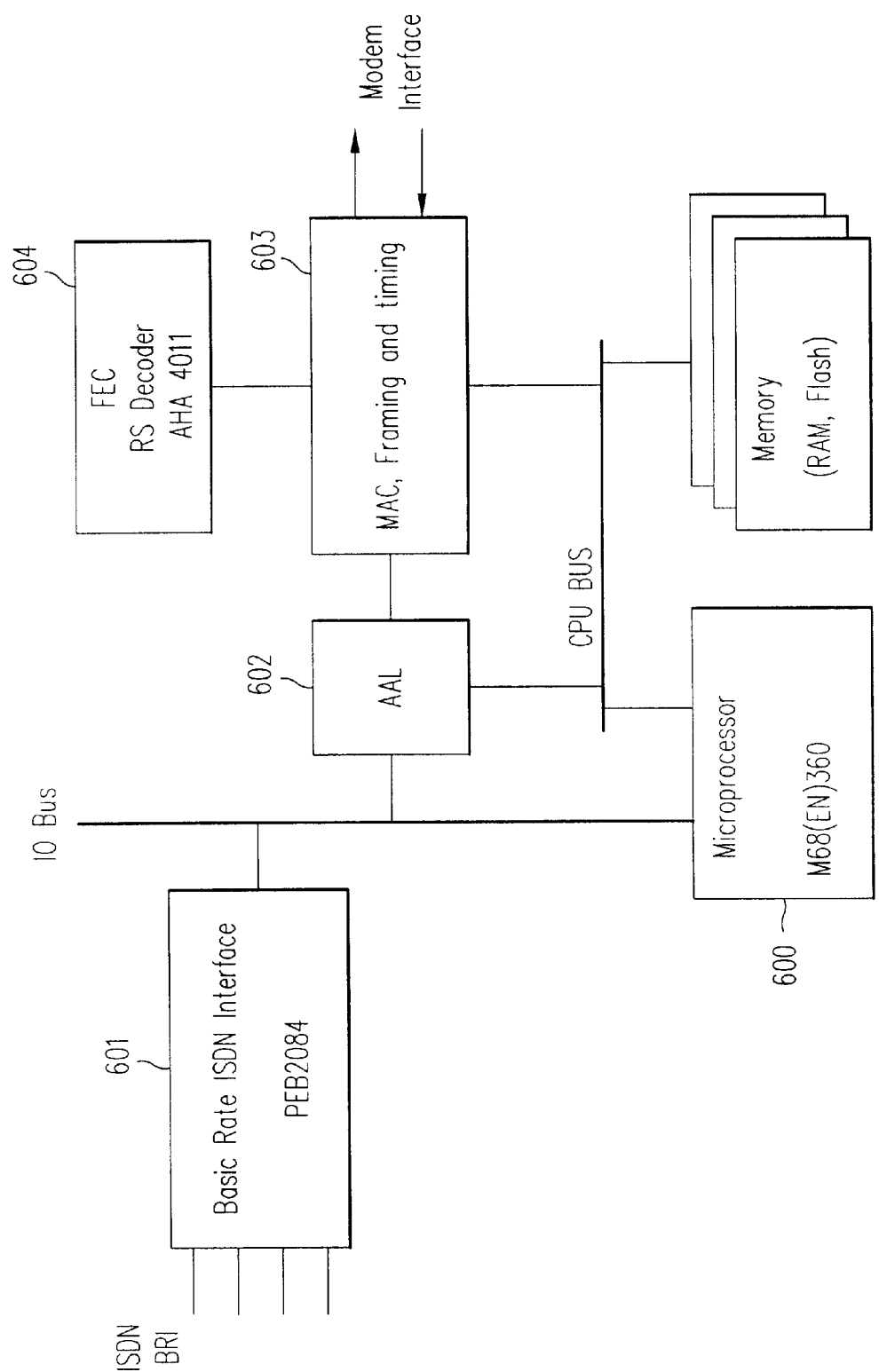
FIG. 6 shows a block diagram of the digital section of a subscriber access system for a basic rate ISDN application.

The SRU structure is application dependent. In many applications, only the digital section 508 changes as the applications change. An example of a digital section to be used for a limited number of ISDN basic rate interfaces is shown in FIG. 6. A microprocessor 600 with built-in ATM formatting capabilities is used for signaling and controlling the entire terminal. The ISDN interface is provided by off the shelf integrated circuit 601. An ATM access layer for converting the payload to ATM cells can be implemented using a field programmable gate array (FPGA) 602. For an ISDN payload, a method known as AAL1 is suitable. A media access control (MAC) device 603, transmits the ATM cells to the modem section 504, shown in FIG. 5. A Forward Error Correction Device 604 and an encryption/decryption device can also be used. The MAC device can be implemented with a gate array. If cell buffering exceeds device capacity, external memory devices (not shown in the drawings) may be added.

Figure 7:
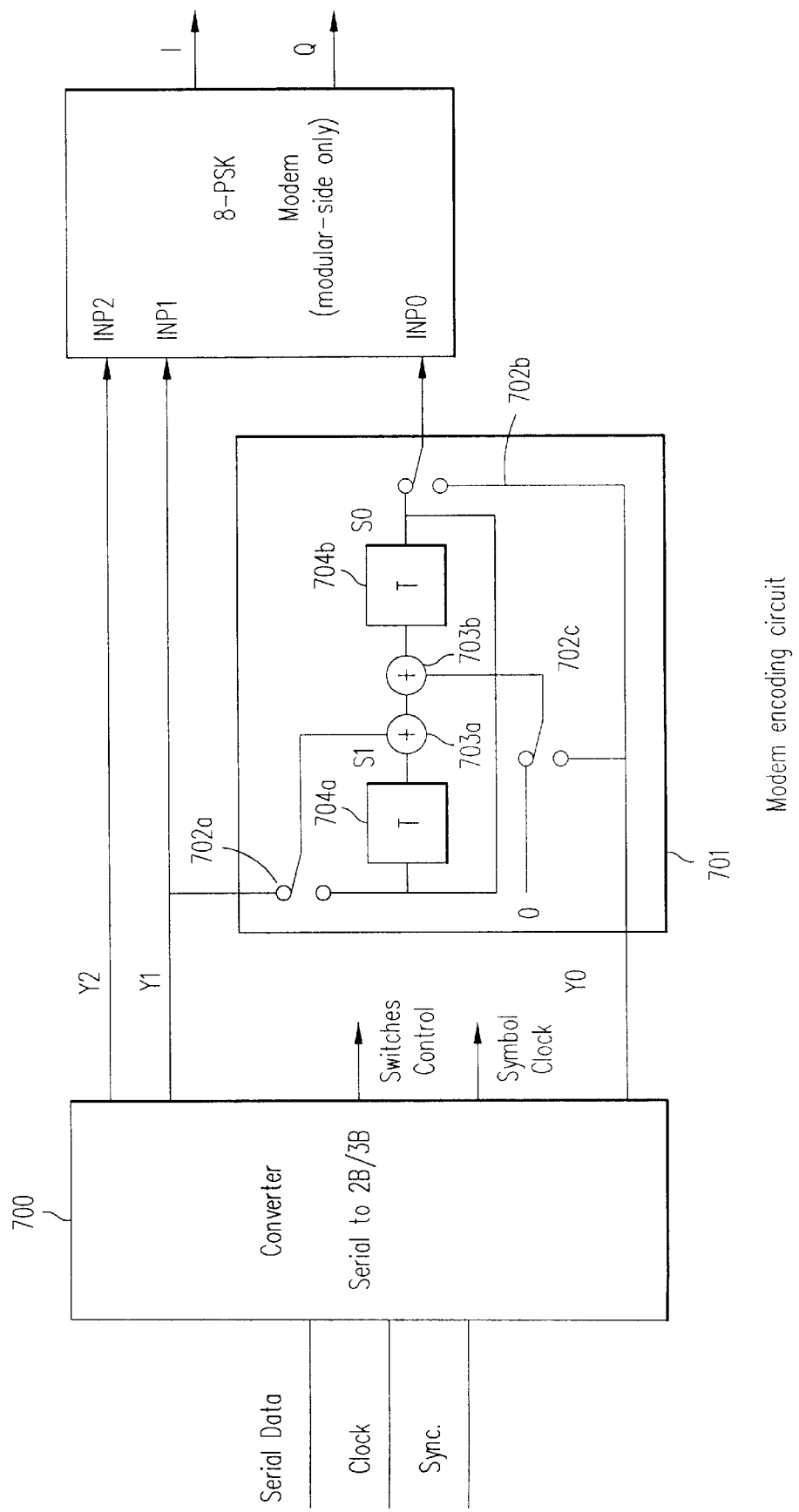
FIG. 7 shows a modem trellis code modulation encoder for the upstream transmission.

Modem 504 operates differently from upstream transmission as compared to downstream. Upstream transmission entails sending bursts of ATM cells while downstream transmission is continuous. Assuming 4-PSK (QPSK) modulation issued in the downstream direction, it is desired to maintain the same symbol rate in the upstream direction. However, to achieve good error control, the short upstream bursts (approximately 64 bytes comprising an ATM cell and its overhead) should be heavily protected, which means large forward error correction overhead, resulting in a reduction of upstream payload throughput. This dilemma is sometimes alleviated by use of trellis code modulation (TCM). In TCM, a higher modulation format is used, for example 8-PSK instead of 4-PSK. Some of the extra bits in the 8-PSK modulator are carefully assigned a linear convolutional code based on the length of the intervals between successive symbol transmissions ("phasor"). These distances are slower in FIG. 8. For example, the squared distance between phasors 0 and 4 is 4 (relative to the radius squared). This technique has some code gain, but is not as effective as Reed Solomon or other similar block codes. In accordance with this invention, the TCM process is modified. First, the code is punctured, i.e. some of the code bits are replaced by data bits. The resulting higher bit rate in turn is used for Reed Solomon (RS) encoding. The overall concatenated code (punctured TCM+RS) has a better code gain then TCM alone for the bit error range of interest to ATM, i.e. a bit error ratio better than $10^{-9}$. The modem encoder is shown in FIG. 7. A converter 700 converts user serial bits to symbols of two or three bits with the pattern 3-3-2-2-3-3-2-2 . . . bits per symbol. A state machine 701 consisting of one-symbol delay elements and XOR gates 703a and 703b, performs convolutional coding of bit Y1 during a 2-bit symbol transmission. During a 3-bit transmission the state machine switches to the down position of switches 702a, 702b and 702c. The resulting state trellis diagram is shown for the first four symbols in FIG. 9. Each branch represents a symbol transmission. Multiple numbers on the same branch represent parallel alternatives of the same state transition. This diagram has a free distance of 2 or more between any two paths that start at the same node and meet at another node. This distance is similar to QPSK, thus the trellis code will perform roughly like QPSK. So far, one half of the extra 50% bits of the modulation gain from 4-PSK to 8-PSK have been used for TCM. The overall code gain is improved by reusing the other half of the extra 50% bits available, that in a 64-byte transmission, allow 14 RS check bytes for error detection and correction plus a few extra bytes for overhead. The modem counterpart in the Base Station receives this encoded message and decodes the transmission using the well known Viterbi algorithm. Even better code performance suitable for this invention is a use of multidimensional trellis code modulation in which groups of symbols, such as two symbols, are aggregated for each step of the trellis code, keeping the code rate at ⅚. In more general terms, a constellation with M bits per symbol is encoded at a rate higher than (M−1)/M, which is ⅔ for 8-PSK as in some modulation schemes proposed for cable modems.

An alternative to TCM is to use 4-PSK with a symbol rate increased by roughly 10–30%, and using the extra bits as RS check bytes. The advantage of this alternative is a more robust modulation scheme and the avoidance of a complex TCM trellis decoder.

The Base Station demodulator receiving this transmission performs synchronization and decoding. If multipath reflections exist in the propagation path, an adaptive equalizer can be used. Due to the short cell size in ATM transmission, it is not practical to include a long training preamble, thus the equalization is done by means of a multi pass process. First the received signals known as I and Q signals are digitally encoded by A/D converters. The digital samples are then stored and equalizer parameters are estimated. Then the equalizer steps back to the beginning of the message and equalizes using with the estimated parameters. Once this operation is completed, the signals are decoded and demodulated using the Viterbi decoding mentioned above. The equalizer parameters can be stored for next reception from the same source, depending on their time variation.

Figure 10:
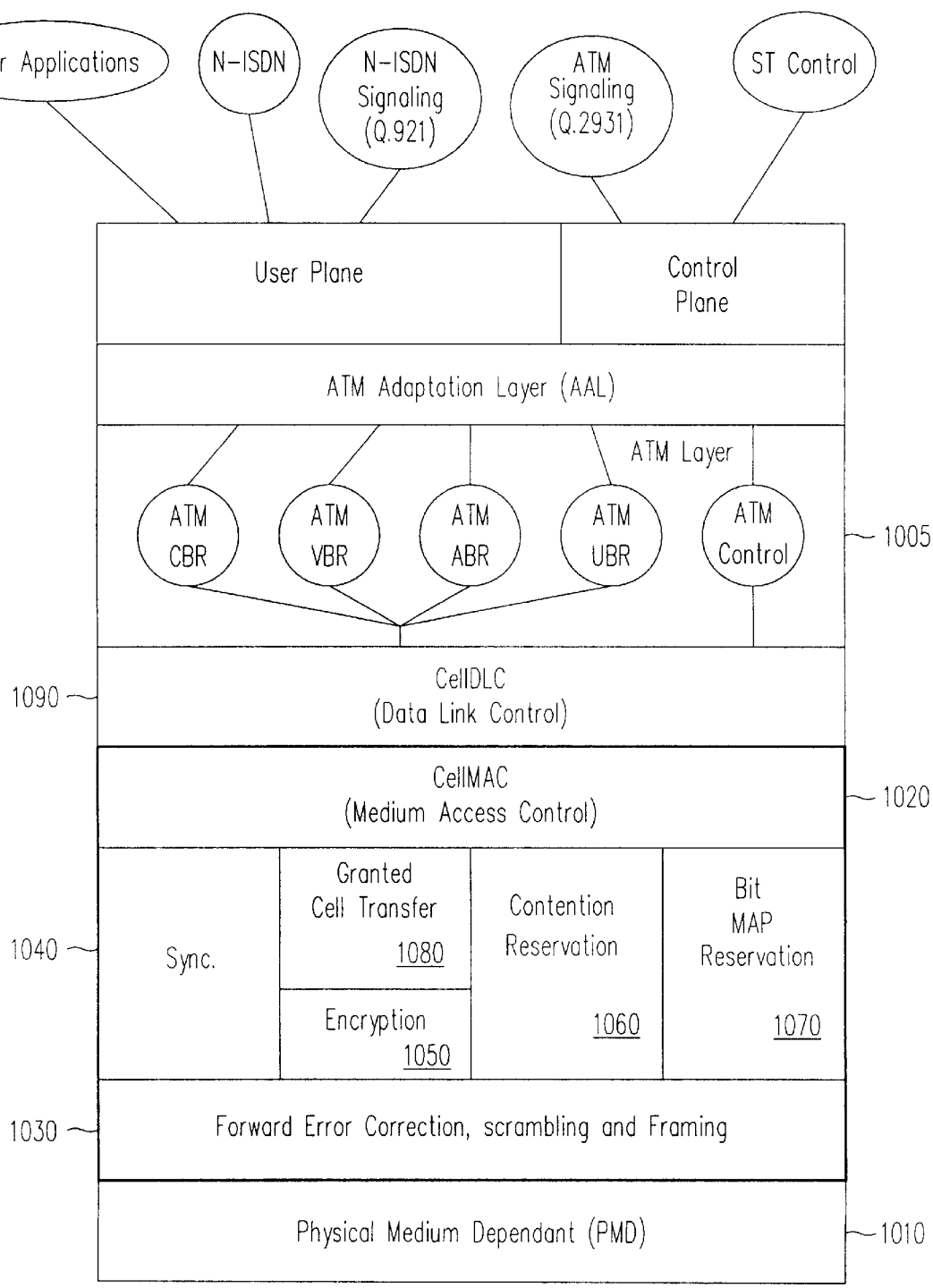
FIG. 10 shows a reference model for the air interface MAC protocol and other protocol layers.

A reference model for the MAC and related protocol layers is shown in FIG. 10. Starting from the bottom, a physical medium dependent layer 1010 provides for the radio transmission and modem functions. The MAC layer 1020 (dubbed here "CellMAC")includes FEC (as discussed above), scrambling and framing 1030. Scrambling is done to randomize the transmission. Framing will be discussed below. The main MAC access attributes are Synchronization 1040—timing adjustment of the delay to the base station. Encryption 1050 of the ATM cell payload is provided by off-the-shelf DES devices, and public key distribution procedures. Three methods of bandwidth request exist: Contention reservation 1060, Bitmap reservation 1070 and implied reservation. Each of these will be described below. The only type of upstream data transmission is via granted cell transfer 1080, i.e. no cell is transferred without a grant (unique permission) from the base station. A data link control 1090 ("CellDLC") layer is provided for optional cell retransmission. This layer is bypassed in most applications, because good error control and detection is already provided by the physical layer as discussed above.

The ATM layer 1005 maintains queues of cells of different service classes. A separate control queue maintains management-type messages between the base and the STs. Upper layers are similar to any ATM application.

The MAC primitives and rules are now discussed. It should be clear that although the MAC layer is described by abstract primitives, each primitive corresponds to a hardware function suitable for implementation by means of a digital gate array. In fact, the first primitive to discuss, ds.block 1110 shown in FIG. 11, is a typical FEC block code ("ds" stands for downstream). Each slot 1101 represents an ATM cell 1102 with its MAC overhead 1100. The block is ended by 16 FEC bytes 1120 of RS code. A slight modification is shown in FIG. 12, in which the slots are "floating" relative to the block timing. This arrangement allows decoupling of the slot size from block size so that mass market low cost DVB-standard FEC decoders developed for satellite television receivers can be used. This standard uses 1 sync byte 1200 and 187 payload bytes, forcing the 59-byte slots 1210 to be randomly truncated, where the missing portion is transmitted in the next block. The slot timing recovery is still possible by a process known as ATM cell delineation, based on the fixed position of the cell header error control (HEC) octet (not shown in the drawings).

Figure 13:
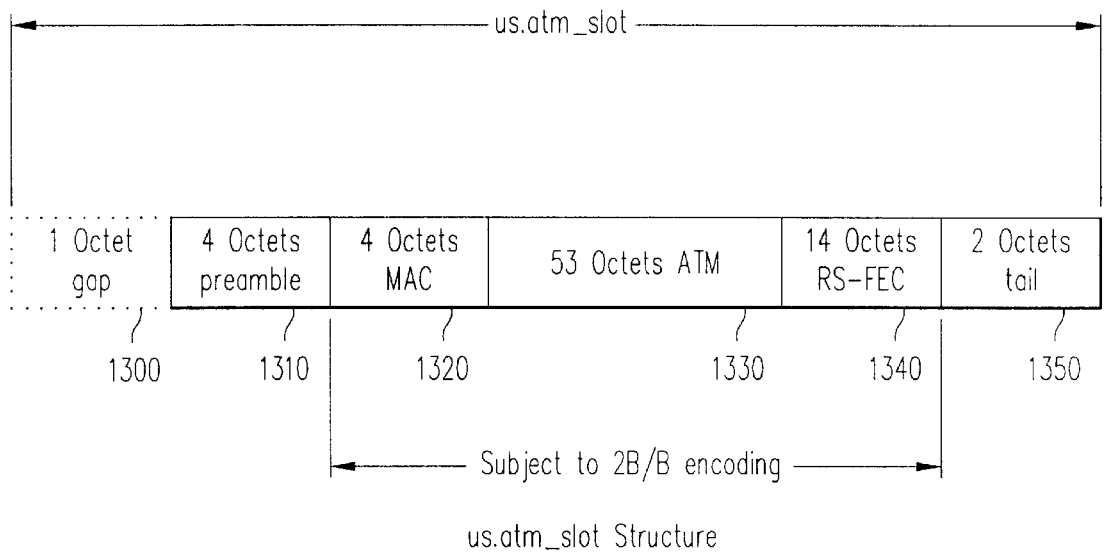
FIG. 13 shows the upstream primitive us.atm_cell structure.

The upstream primitive us.atm_cell consists of only one cell because each slot may be used by another ST. As shown in FIG. 13, the upstream primitive ATM cell consists of 1 octet gap 1300, 4 octet preamble 1310, which uses the 8-PSK modulator as a pseudo random sequence of phasors "0" and "4" (essentially BPSK) to allow the demodulator to synchronize the timing and phase of the incoming signal. The block also includes the MAC overhead 1320, ATM cell 1330, RS check bytes 1340 and a tail 1350 for TCM decoder state resolution.

Figure 14:
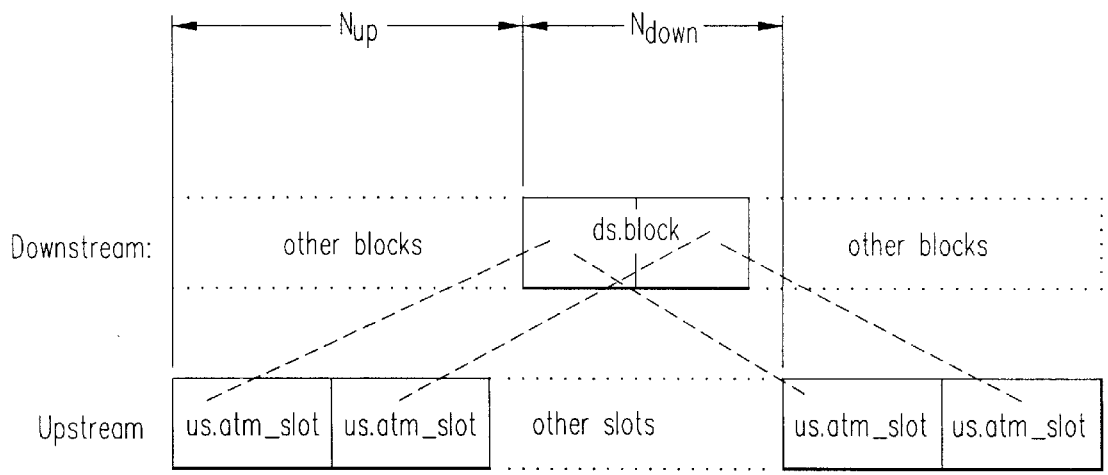
FIG. 14 shows the timing relationship between the downstream and upstream slot and pointers relationship as viewed from the base station.

The MAC layer maintains a fixed timing relationship between each downstream slot and each upstream slot. This allows it to refer acknowledgments of past transmissions and grants of future transmissions without need to specify the time acknowledged. A fixed system parameter of upstream delay Nup and downstream delay Ndown, all referred to The Base Station timing, is used, RS shown in FIG. 14. For example, Nup=20 slots offset and Ndown=25 slots offset. All STs adjust their delay to appear in sync at the base.

Bandwidth reservation is done by means of one of three options. Constant bit rate services receive grants periodically without request. The Base Station management program provisions such grants and configures the BSC MAC device to issue periodic grants. In the resulting upstream transmission, the MAC overhead reports the queue status. As a result, the downstream MAC controller can consider this queue status report in prioritizing grants. A second method of requesting a grant is the unsolicited transmission of a short block, us.request, including 1 gap octet, 4 preamble octets, 2 address octets, 2 queue status octets, 2 CRC (error check) octets and 4 FEC (RS) octets. About 5 or 6 of those primitives can fit in one slot time, thus the slot is divided into 5 or 6 "minislots", increasing the opportunities to request bandwidth. From time to time the base station issues global grants indicating a contention slot that allows transmission of these requests. A contention algorithm is used to resolve collisions. This is done by a stabilized slotted aloha or START-3 protocol well known in the literature. For example, an ST maintains a timer that is cleared after every cell it transmits (with queue status indicating more cells waiting). If the timer expires, the ST selects a minislot at random and performs the START3 protocol from the same minislot position in future transmissions. Upon receiving a grant, the ST stops contending until the next timer expiration.

Figure 15:
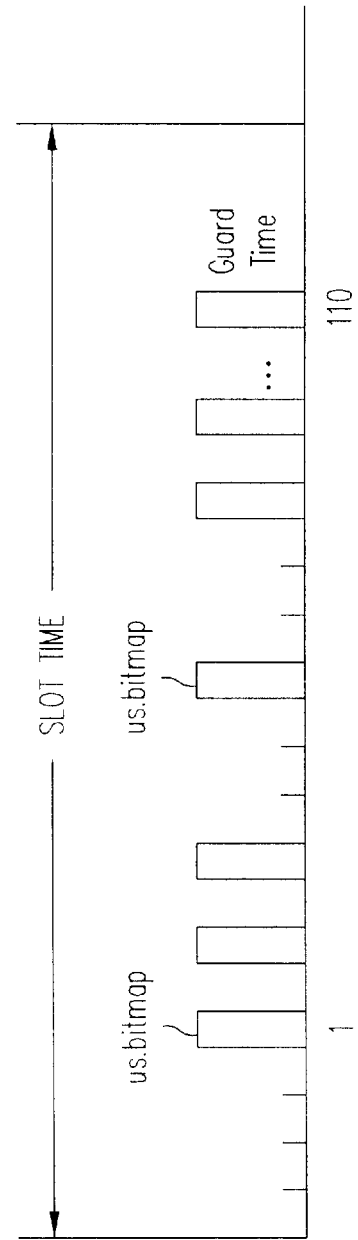
FIG. 15 shows the timing concept of bitmap reservation.

The third method to request bandwidth is the bit map option. Each ST of a limited group (say 110), is provisioned with a single symbol position in a special upstream slot granted as "bitmap" type, as shown in FIG. 15. Each ST of the group with expired timers transmits a signal that is equivalent to asserting one symbol. This method is collision free and thus is very fast and efficient. Since it is not practical to detect a single bit transmission, the bit primitive is actually a short PN sequence, for example 15 symbols long. The receiving modem correlates the received signal by this sequence and records the peaks as individual symbol positions. Although the bitmap sequences overlap, the correlation peaks happen at single symbol times and thus are separable.

Figure 16:
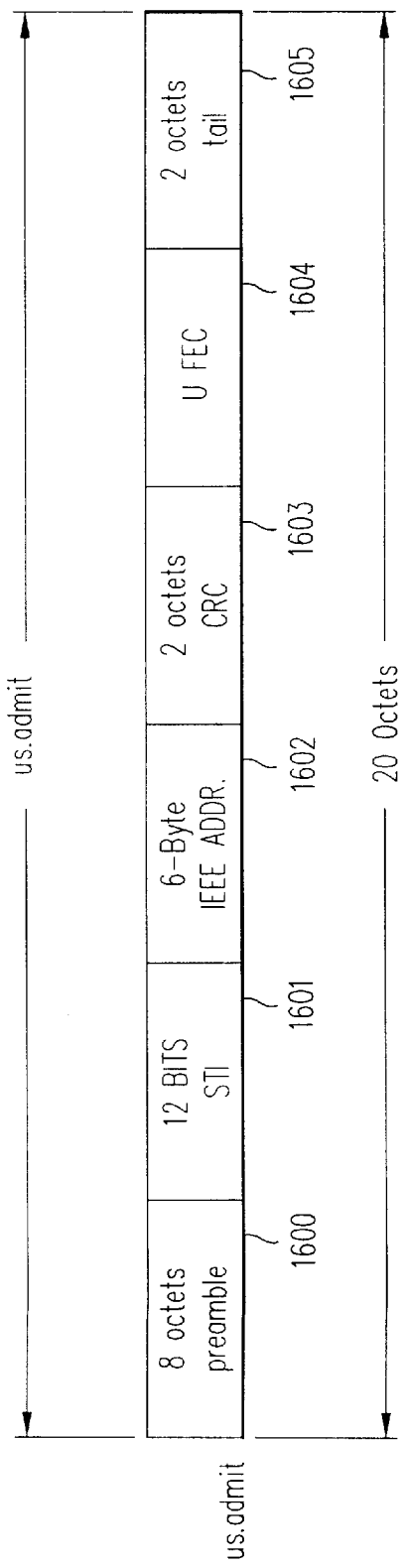
FIG. 16 shows the admission request primitive.

The us.admit primitive is shown in FIG. 16. This primitive is sent only if a slot is granted as admission slot. Admission is a process of adjusting ST timing and power before the ST is allowed to receive grants for ATM cell (us.atm_cell) transmissions. There are two types of admission messages, cold and warm. A cold admission is a first time request sent by a newly placed ST. The us.admit includes an 8-octet preamble 1600, carrying a PN sequence or a fraction of a PN sequence of 32 symbols using only the phasors "0" and "4". A Subscriber Terminal Identifier (STI) 1601 is then transmitted. A cold ST uses a special temporary STI value of 000 . . . 01. A 6-byte IEEE address 1602, similar an to Ethernet address, installed during manufacturing, uniquely define the ST. A 2 octet cyclic redundancy code (CRC) 1603, a 4-octet RS FEC check 1604, and a 2-octet tail 1605 are used. The Base Station Controller grants several consecutive slots for admission requests. These grants are repeated number of times per second. The number of slots (say 4) is such that the delay uncertainty of a new ST will not cause it to step on other slots. If the us.admit primitive is received without error, a downstream message will be broadcast to all STs with STI of 000 . . . 01 and a management service access point identifier to be discussed in conjunction with FIG. 17. This message will repeat the IEEE address and will also include a new STI assignment, a delay figure and a power adjustment figure. If admission failed, a collision indication is placed and the ST must try again in the next granted admission slot group. A START-3 or slotted aloha protocol may also be used to accomplish this function.

A warm admission is used for an ST that already has an STI, but lost sync for some reason. If a warm admission is not successful, a cold admission must be restarted.

Figure 17:
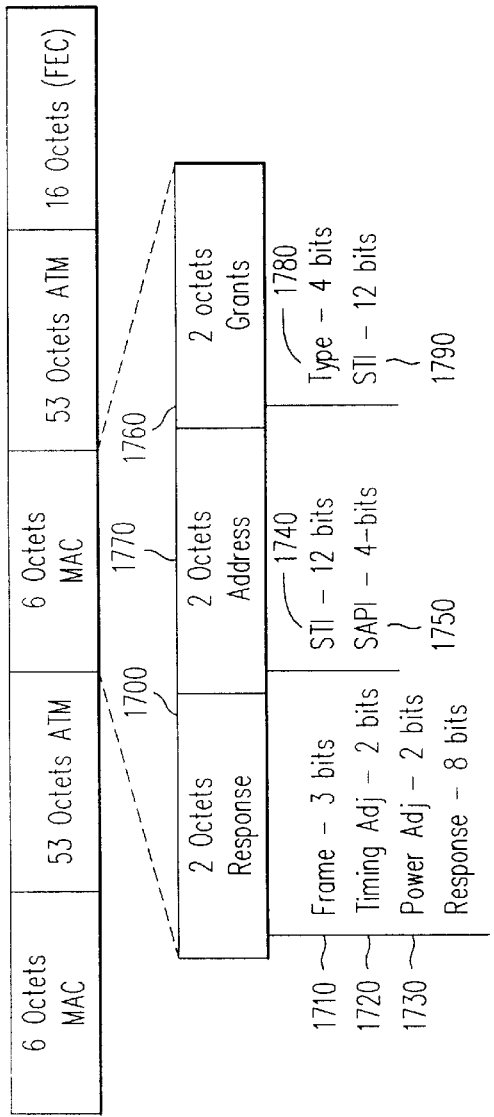
FIG. 17 shows the structure of each downstream slot associated with the CellMAC overhead structure.

The content of a downstream MAC overhead is shown in FIG. 17. The first two octets 1700 represent mostly response to the events that took place Nup slot-periods ago. There are four types of slots: ATM, admission (grouped into four slots), contention(divided to six minislots) and bitmap. All of these slot types have been defined above by the primitive types they carry. The response includes specific bit meaning based on the slot type. The response includes 3 frame bits 1710 used for global synchronization of frame (say every 126) slots (the first bit is toggled, else it is zero, the second bit is eight times slower and the third bit is still eight times slower then the second). These bits allow coordination of events, such as starting of a new connection ahead of time, and among many STs. Next are timing adjust 1720 and power adjust 1730 bits. These bits are valid only if the response is to an ATM slot type. The next octet is a response vector. For an ATM slot this next octet acknowledges reception (0) or error (1). For a contention slot this octet indicates collision so that a certain number of bits in this octet correspond to a minislot and the rest of the bits are undefined. For admission this octet represents collision in any of the four admission slots, and this octet value will be repeated for all contiguous admission slots.

Figure 19:
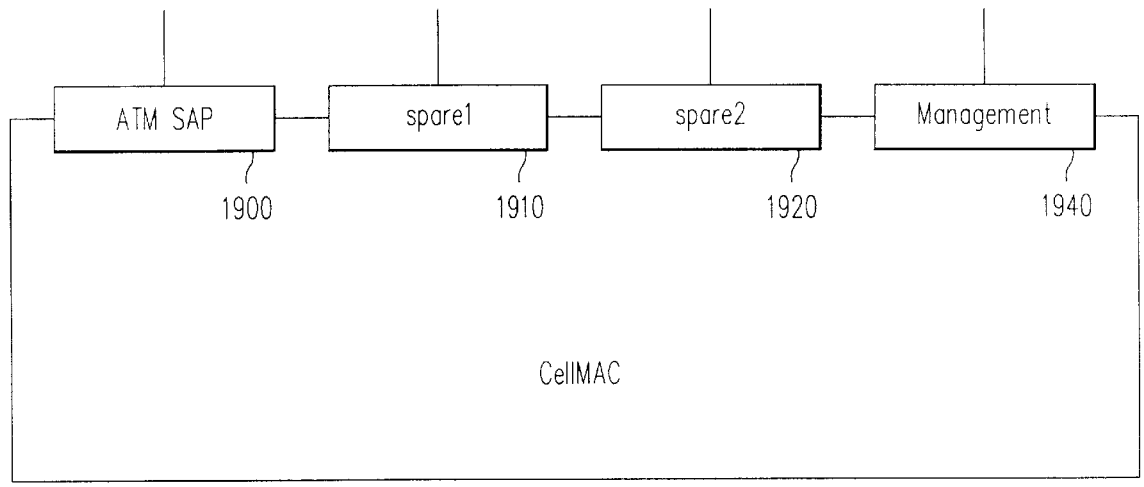
FIG. 19 shows the concept of MAC SAPs.

The next 2 octets 1770 include STI 1740 and service access point identifier 1750 (SAPI) which is a MAC sub-address to be further discussed in conjunction with FIG. 19. These fields indicate the destination ST address of the current downstream ATM cell. Some STI values are reserved as group addresses, allowing multipoint broadcast. The ST MAC controller may include several STI registers so that address decoding is ORed with all registers for inputting a cell from the ds.block primitive. The last two octets 1760 are grants for an upstream slot Ndown ahead. The grant includes slot type 1780 (2 bits required, 2 more reserved bits) and STI 1790. The STI is meaningful only if the slot type is ATM.

A more formal definition of the above fields is shown in Table 1.

TABLE 1

| ds.CellMAC | { | | |
|---|---|---|---|
| 3-BIT | | FRAME | /* frame timing |
| | | | /* next 3 nibbles are related |
| | | | /* to the upstream inf. |
| | | | /* sent $N_{up}$ slots ago |
| 2-BIT | | TIMING_ADJUST | /* fine tune ST clock delay |

TABLE 1-continued

| | | |
|---|---|---|
| 2-BIT BYTE vector | POWER_ADJUST RESPONSE | /* adjust ST transmit power /* contention COLLISION /* (one bit per minislot) or /* COLLISION for us.atm_slot |
| 12-BIT NIBBLE | PAYLOAD_STI SAPI | /* the next two octets are /* related to the ATM cell /* attached to this.CellMAC /* ST identifier (address) /* ST sub-address |
| NIBBLE | TYPE | /* the next 2 octets are related /* to an upstream slot N$_{down}$ /* slot from the current one. /* slot type, either one of: /* us.atm_slot. /* contention slot. /* bitmap slot /* admission slot |
| 12-BIT | GRANT_STI } | /* STI for us.atm_slot |

Figure 18:
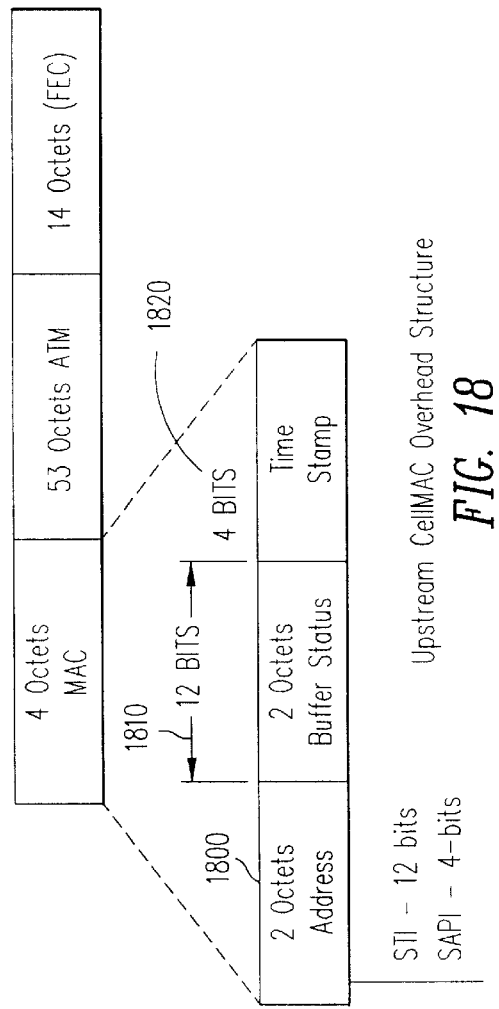
FIG. 18 shows the upstream primitive MAC overhead structure.

The upstream MAC overhead is depicted in FIG. 18. It includes the STI/SAP of the sender 1800, 12-bit buffer status 1810 and a four-bit time stamp 1820. The buffer status is an indication of all ATM cells waiting for transmission in this ST. If none exists, an all zero status is transmitted. Otherwise a map function is defined to map each queue status to this short message. An example of a map is: each four bits represent one of three service priority levels. For each level, the four bits indicate the level of queues utilization, i.e. 0000 is empty, 0001 is $\frac{1}{16}^{th}$ full and 1111 is $\frac{15}{16}$ full or completely full. The queue capacity can be transmitted once by upper management layers, as it is not varying in time. The time stamp indicates the cell delay variation (CDV) relative to its ideal transmission time in units of slots. If an ST expects a grant for a time sensitive signal at slot x, but receives the grant at slot x+t for a maximum value of T, then t is transmitted as the time stamp. This time stamp allows the BSC to reduce CDV by delaying all cells by T-t slots.

The concept of service access points SAP is shown in FIG. 19. ATM SAP 1900 carries user's data while a management SAP 1900 carries BS to ST management information. SAPs 1910 and 1920 are reserved for future use. One potential use is a separate SAP for each ATM service category, such as constant bit rate (CBR), variable bit rate (VBR), available bit rate (ABR) and unspecified bit rate (UBR).

In supporting all of these services, a separate SAP identified by a SAP Identifier (SAPI) allows direct connection to each type of queue, e.g. the MAC circuit has one port per SAP. The implementation of the queues is application specific. Queue-control hardware and software are widely available from ATM switch components and LAN interfaces vendors.

Figure 20:
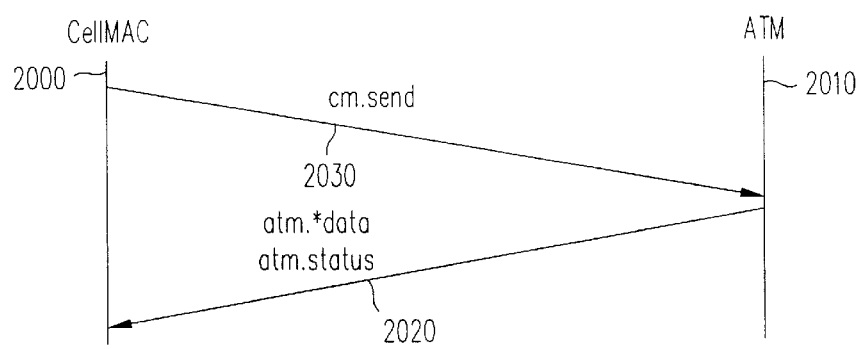
FIG. 20 shows the handshake between the MAC layer at the subscriber side and the ATM layer.

The operation of the MAC layer can be described by ladder diagrams. FIG. 20 shows a simple handshake of the ST MAC layer 2000 commanding the ATM layer 2010 to send a cell. The ATM layer 2010 returns a pointer 2020 to the data (cell) in memory and the queue status. The cm.send primitive 2030 can be implemented by a signal on a specified pin in a MAC gate array, and the data/status can be implemented by buses on the same IC. A convenient way to implement the data bus itself is the Utopia Bus as defined by the ATM Forum. The handshake of FIG. 20 implies that a send command comes from the MAC, rather than being initiated by the ATM layer. Therefore, the ATM layer will transmit only when a grant is received. However the ATM layer can indirectly request transfer, as shown in FIGS. 21–22. FIG. 21 shows an atm.have_data primitive (again, just an interface pin or an electric signal), initiating transfer by requesting bandwidth via the bitmap mechanism combined with status. The MAC 2110 sets the appropriate bit (i.e. it sends the bitmap PN sequence) when the downstream indicates a grant type bitmap. Then the bitmap is set (us.have_data 2120 represents setting the bit) and eventually a grant arrives, enabling the transfer. FIG. 22 illustrates similar schemes, but without a bitmap, which employs contention via a minislot. The bitmap is faster and therefore preferred; however if it is not implemented, the contention mechanism of FIG. 22 is used.

Figure 23:
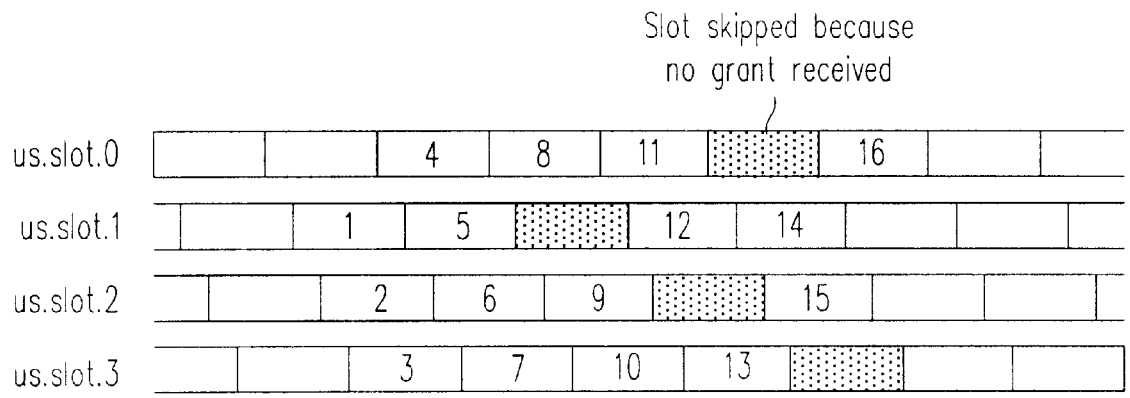
FIG. 23 shows the transfer of ATM cells by an ST which is capable of transmitting in four channels.

So far the MAC protocol has been described for a symmetrical single channel transmission with frequency duplexing, such as a single 7 MHz channel. However, this protocol can be extended with minor changes to fit other situations. One such occurence is when the downstream signals run N times faster than the upstream signals. Each set of STs receives the fast signals but responds on one of N separate channels. In this arrangement, the slots are simply multiplexed in the downstream in the sequence: SLOT1_CHAN1, SLOT1_CHAN2 . . . SLOT1_CHANN,SLOT2_CHAN1 . . . where the STs can identify their stream of slots by observing the change in the frame bits as discussed in conjunction with FIG. 17. The first frame bit to toggle corresponds to channel 1. Another extension is an ST that needs to transmit on all four channels. This may happen in some higher capacity applications. As shown in FIG. 23, for N=4, the N channels are skewed in time so that channel i starts 1/N of a slot time after channel i−1. As a result interleaved cells arrive in the order in which they were transmitted. FIG. 23 shows cells transmitted from a single ST in the order 1,2 3 . . . skipping busy slots. Each transmission in a slot occurs because of a grant to that ST.

Although the MAC protocol as described is a frequency division duplex (FDD) structure, it can also be applied to time division duplex (TDD) with slight modifications. The main modification is that the correspondence of downstream slots to upstream slots for purpose of response and grants is defined relative to upstream slots on the same frequency channel. If the upstream and downstream directions have asymmetrical bandwidth allocation, the downstream being N times wider than the upstream, then only one of the N downstream ATM cells carries a MAC overhead and the other N−1 ATM cells are transmitted without any MAC overhead.

In accordance with this invention, grants are not directed, i.e. when an AT receives a grant to transmit a us.atm_slot primitive, the ST chooses which one of the currently available ATM cells to transmit. This freedom preserves link bandwidth by avoiding transmission of the cells virtual circuit number (VPI/VCI in ATM terminology). However, a potential problem may arise if a grant intended for constant bit rate (CBR) service arrives too early and is used for another service (say ABR) only to find out later that there will be no other grant for this ST. This problem is solved by the following algorithm. The BSC maintains a list of all CBR connections and their period and the last slot that was used in the upstream for this connection. The BSC calculates the new expected grant time and the BSC normally grants this slot to the ST with this circuit. However, if due to conflicts of two or more CBR circuits at different rates whose expected slots coincide from time to time, only one of them will be granted and the rest will be delayed within a time window W1 of 10 slots. Each CBR circuit handler at the ST (such as the AAL device 602 in FIG. 6) maintains a window of period W2 slots (say W2=10, but needs not be equal to W1) starting with the expected slot. Only grants for slots within this window may be granted to this connection. If multiple connections have overlapping windows, the window that started earliest, i.e. the oldest window will get the grant, as long as it has not expired will get the grant. This process causes cell delay variation anytime the grant is not available for the circuit at the beginning of the window. The CDV can be eliminated using the time stamp mechanism discussed above.

Figure 24:
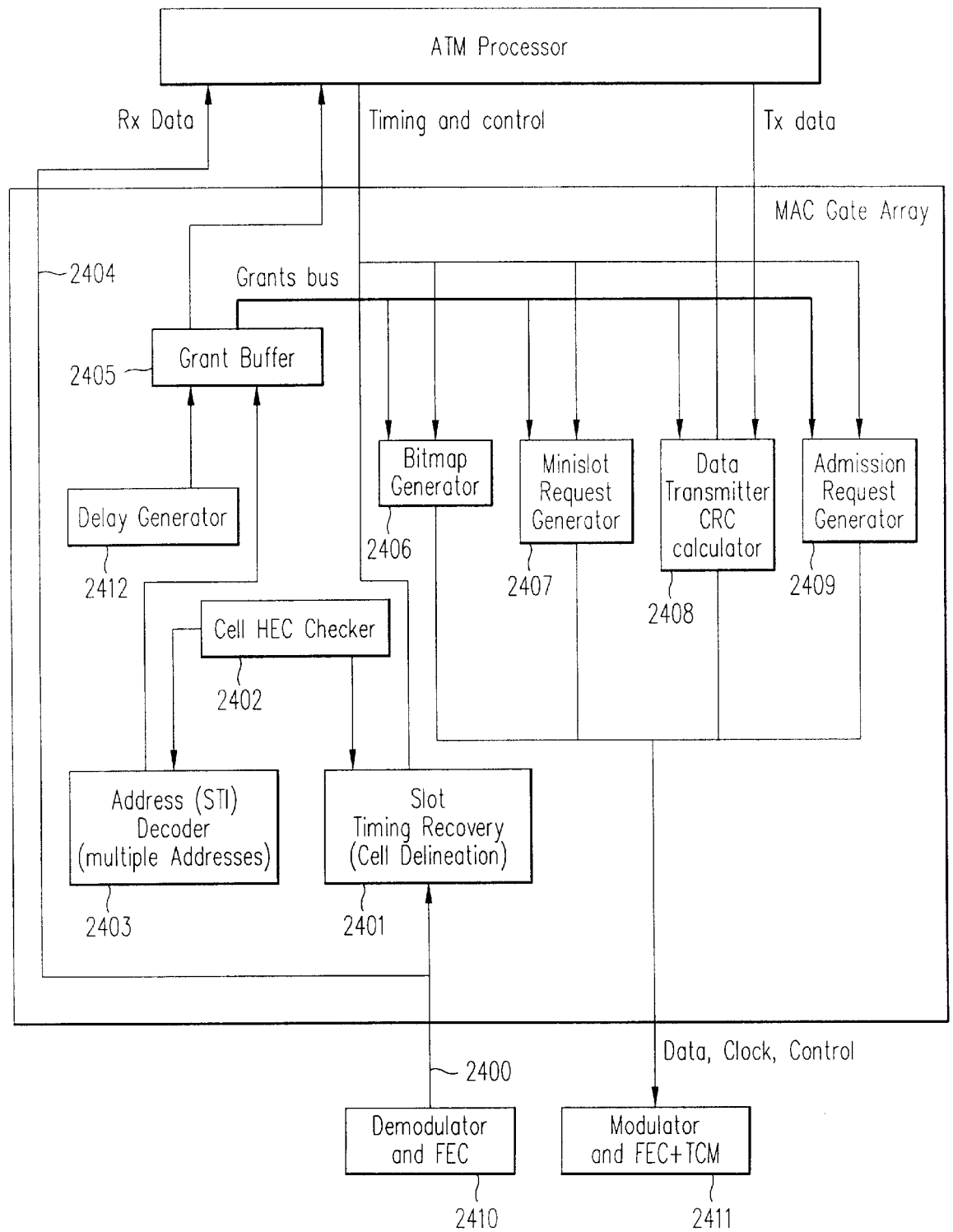
FIG. 24 shows a block diagram of a base station.

The MAC protocol can be implemented in several ways. One approach is to delegate all time critical functions to a field programmable gate array (FPGA) with attached memory devices, encryption/decryption devices and forward error encoding/decoding devices. The FPGA block diagram for a subscriber terminal is shown in FIG. 24. The ds.block primitive is decoded externally and the recovered data, clock, error detection and timing signals 2400 are brought to the FPGA. If needed, the demodulator 2410 is informed specifically of which ST is expected in the current slot time. This enables the demodulator 2410 to store and retrieve the contents of the latest known power level of this ST, thereby reducing the chance of error or the acquisition time of power level and frequency offset. The slot timing is recovered first by a timing and cell delineation circuit 2401, with the aid of a cell header error control checker 2402. Next, the address field STI in the MAC overhead is checked by an address decoder 2403 to check if the currently received cell should be dropped for local use. Several STIs are compared—one is the local STI (which equals 0 if the admission process has not been completed) Several group addresses may also be checked. A dropped cell is delivered to the application via the RxData bus 2404 which may be the Utopia Bus. Next the grant type and grant STI are examined by the address decoder 2403, and if the grant is locally valid, it goes to a grant buffer 2405 and delayed by Ndown slots compensated to the ST's specific distance from the base station by a delay generator 2412, whose specific delay value has been set by an external microcontroller during the admission process. The grant type and timing are signaled to the various upstream primitive generators by a grants bus. This controls the generation of bitmap requests 2406, minislot request 2407 (us.request), us.atm 2408 and us.admit 2409. Each of these primitives is generated by a bit sequence loaded from an external microcontroller except for status and data that are passed directly from the application. The transmitted signal with appropriate timing indications is sent to the modulator 2411 which is also performs encoding and scrambling.

Figure 25:
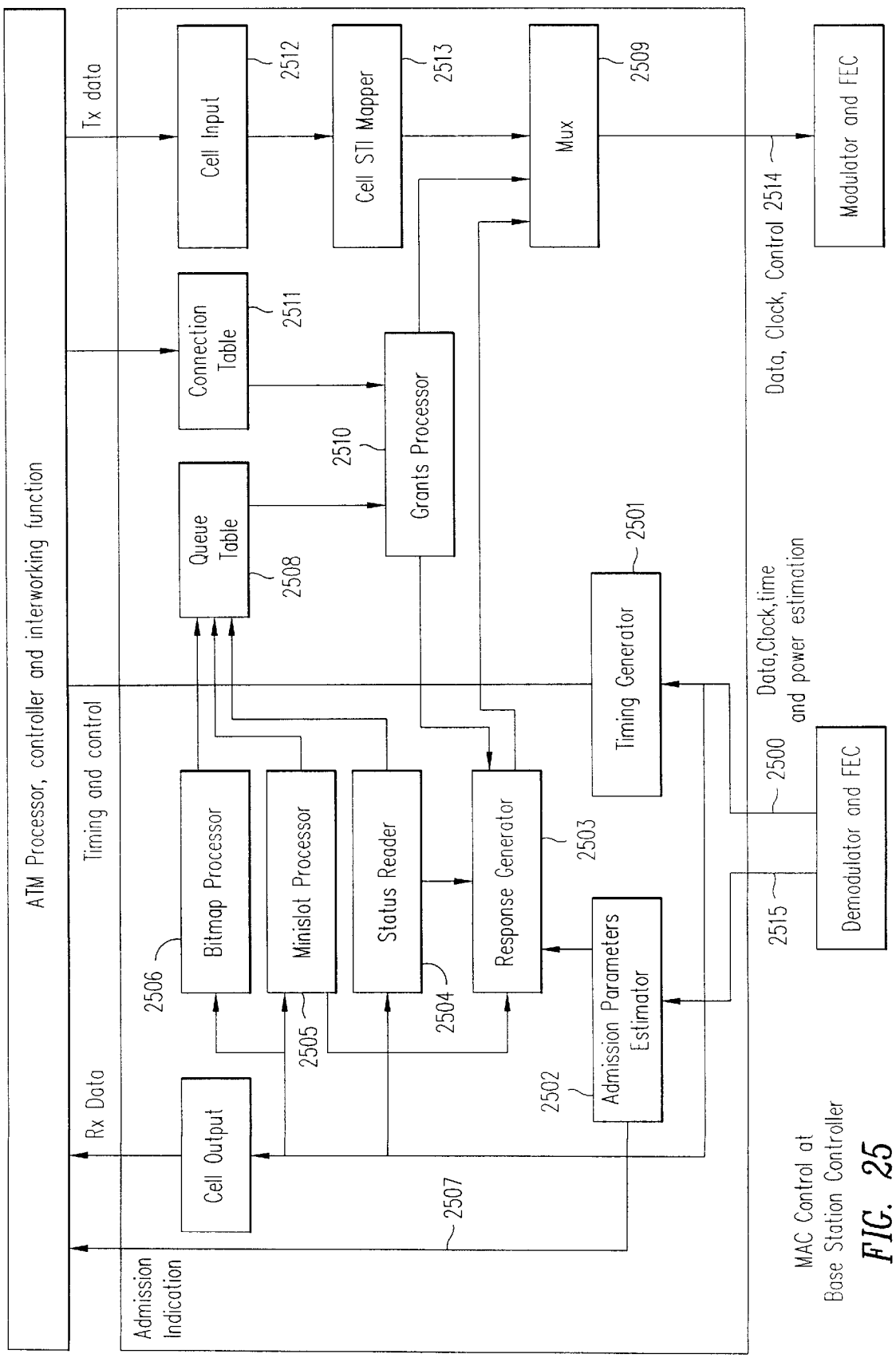
FIG. 25 shows a block diagram of the MAC layer controller at the base station.

The Base Station MAC control section is shown in FIG. 25. This section may be implemented on a printed circuit board level, including multiple memory and FPGA devices as may be required. The MAC controller receives MAC primitives from the burst demodulator via a bus 2500. This bus indicates data, timing, estimated reception power and error messages. A timing generator 2501 controls the reception and transmission of MAC primitives. It is synchronized via external timing reference means and control signals 2502 allowing the slot timing to be frequency locked to a global synchronization such as the telephone network primary clock or global positioning system. If the reception slot is an admission slot, the admission parameters are estimated based on the modem input 2515 by an estimation circuit 2502. If admission request is detected, it is passed to the Base Sector Controller via an indication bus 2507. In a us.request reception, the minislot processor 2505 decodes the request and deposits the queue status from the request into a register bank called queue table 2508. Similarly, if a bitmap slot is received, all set bits are written into the queue table 2508 by the bitmap processor (decoder) 2506. Other conditions on a reception, such as normal us.atm_cell cell reception and loss of data, are decoded by a Status Reader 2504. The Status is written to the queue table 2508, and the indication of success or failure of reception is indicated to the Response Generator 2503. The response generator updates the response field in the ds.block primitive via a multiplexer 2509. A grants processor 2510 scans the queue table and selects the ST to receive a grant. That ST's address (STI) is written in the address field of the multiplexer 2509. The grants processor 2510 makes its grant decision not only according to the queue content 2508 but also by a connection table 2511 that lists all constant bit rate virtual circuits (VC). Thus, for each such VC it checks whether the next upstream slot to be granted should get a grant related to this VC. Only if none of the CBR VCs has a non-expired window of transmission, a grant based on the queuing table 2508 is selected. Once a grant is made, the related STI and SAPI are read from the connection Table 2511 and sent to the multiplexer 2509. The grant processor 2510 can be implemented by a combination of an FPGA and a RISC processor. The FPGA performs a priority encoding (decision) of the next ST, while the RISC processor performs the background tasks of maintaining the queue table. For example, if a particular ST is selected by the Grants Processor 2510, the queue status entry for that ST is modified according to the following algorithm:

1. Modify Queue status for this ST as it would appear after one cell is subtracted from the highest priority queue.
2. If a nuw status is received from the same ST (via us.request or us.atm_cell), the new status overrides the modified one.
3. If no valid cell was received from the ST at the granted slot (most likely due to link error)and no new status update of step 2 was done, then restore original queue status.

Cells to be transmitted downstream arrive from the application layer which can be an interface circuit to the ATM network. The cells are delivered in the order in which they are received by a cell input circuit 2512, to which the cell destination address (ST and SAPI) is added by an ST Mapper 2513 based on a connection table 2511. There are two ways to implement the STI Mapper, depending on the choice of ATM address space in a particular ATM application. If all STs share the same address space (VPI/VCI), then the Connection Table 2511 assigns an STI/SAPI to each VPI/VCI. In other applications, the address space may have only local context (two STs may reuse the same VPI/VCI of their ATM cells for totally unrelated connections), then the ATM application must provide the STI/SAPI for each cell to be sent. The application in this case is most likely an ATM switch or an ATM statistical multiplexer that can treat each ST as a logically separate port.

The multiplexed downstream transmission is handed to the modulator, scrambler and FEC encoder via a transmit bus 2514. If needed, the cell input circuit 2512 may add encryption to the payload field (48 bytes) of the ATM cell.

A base station Controller, shown in a block diagram in FIG. 26, consists of one or more single channel controllers 2600, and a linear frequency division multiplexer 2601. Each single channel controller 2600 includes an IF circuit 2602 (amplifiers, filters, AGC circuits as required), a modem 2603 having QPSK continuous modulation for downstream transmission with RS FEC, scrambling and sync as described above in conjunction with the ds.block, and a burst modem with TCM and RS decoding and the ability to detect the various upstream primitives described above, a MAC Controller 2604 as described in conjunction with FIG. 25, and a Control Unit 2605, based on a microprocessor circuit and connected via data or I/O buses to all other subsystems (connection not shown in FIG. 26). An Interworking Function 2606 converts the ATM cells to and from the MAC Controller 2604 to whatever format the carrier network requires, such as ATM, Frame Relay or narrow Band ISDN. This function is thus application specific and, in most cases, can be found in existing ATM switches and multiplexers. A line interface 2607 converts the traffic of the Interworking Function 2606 to the network format such as T3/E3 interfaces. As an option for improving cellular network coverage by minimizing interference from geographically adjacent cells, an Adaptive Radio-resource Manager (ARM) Controller 2608 may be included. The ARM Controller is a microprocessor application that responds to commands from a network management system application that coordinates frequency/time activities among multiple sectors and cells. For example, if the network management system finds that a particular ST interferes with another base station, the network management system may instruct that base station to skip those cell slots affected or shift the ST entirely to another frequency. The ARM controller 2608 makes the Base Station Controller capable of receiving such commands from an external controller. The key element for ARM operation is global synchronization of all sectors and cells, as described above. By having all base stations maintain a fixed relationship of the MAC frame/multiframe bits to the global time reference, it is possible to devise algorithms to map transmission from an ST in one sector to interference in another sector or cell. Thus the timing generator 2501, shown in FIG. 25, is locked to global time and, in effect, acts as a real time clock. It should be clarified that all real time clocks need not be in identical phase in each cell, as long as they maintain the same difference with each other for a long time. Multiple channels are processed by repeating the same channel structure 2600 as many times as needed. These channel controllers may need to share or switch data among themselves, which can be accomplished via a bus 2610. Finally, all controllers can share the same enclosure or equipment rack to form a base station. Each Base Sector Controller has a coax cable leading to a Base Radio Unit (BRU) 2611. The BRU includes IF circuits, converters, frequency synthesizer, amplifiers and a diplexer, driving the sector antenna via a waveguide. Such BRUs are commercially available. For example, Netro Corporation of Santa Clara Calif. has a BRU for 38 GHz which, with proper scaling, can be redesigned for other frequencies.

Figure 27:
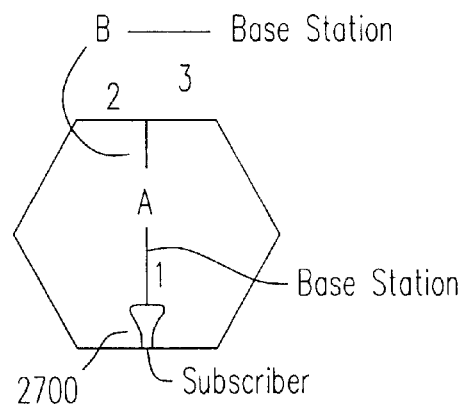
FIG. 27 shows a model of interference from remote base station to a subscriber.
Figure 30:
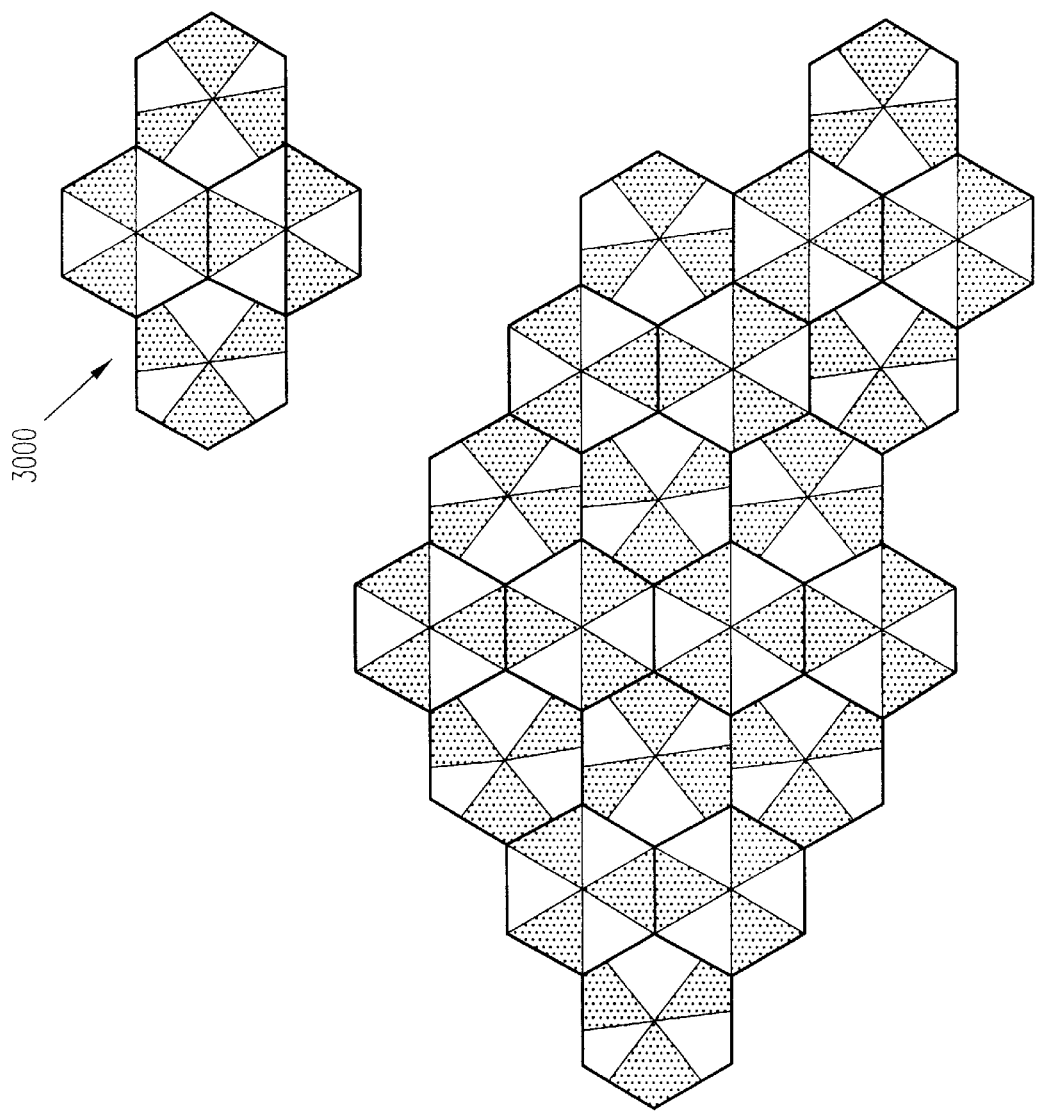
FIG. 30 shows a cellular coverage map with asymmetrical sectors but one pair of frequencies.
Figure 31:
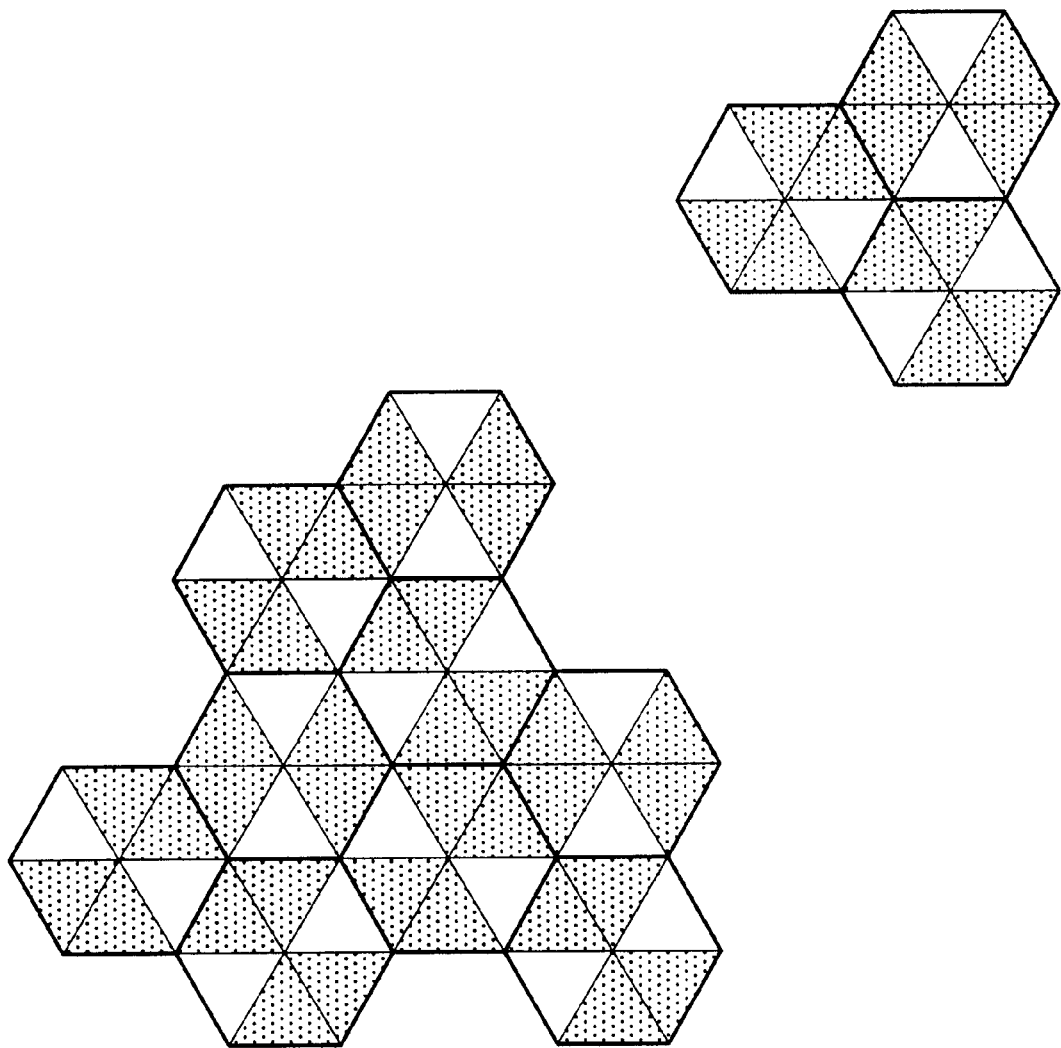
FIG. 31 shows a cellular map with three frequencies.

The sector antenna is a pyramidal horn with a rectangular aperture and optional modifications as described below. To minimize interference and to maximize frequency reuse, special care is taken of the Base Antenna. As seen in FIG. 27, one potential mode of interference is a subscriber terminal 2700 receiving from Base Station A with radiation pattern 1, which also receives from base station B with radiation pattern 2. If pattern 2 is in a different frequency than 1, interference is negligible. It is assumed here that base stations located further away, say another cell diameter behind B, are too far to cause significant interference. In this simple scheme, two frequencies are sufficient to avoid interference. In fact, when multiple cells are drawn together, as shown in FIG. 30, two frequencies are sufficient to avoid the interference mode of patterns 2 to 1 in FIG. 27. FIG. 30 is a lattice based on a four cell structure 3000. This structure has one drawback: some of its sectors are wider than the others. If this is not acceptable, a three-frequency symmetrical solution also exists, as shown FIG. 31.

Figure 28:
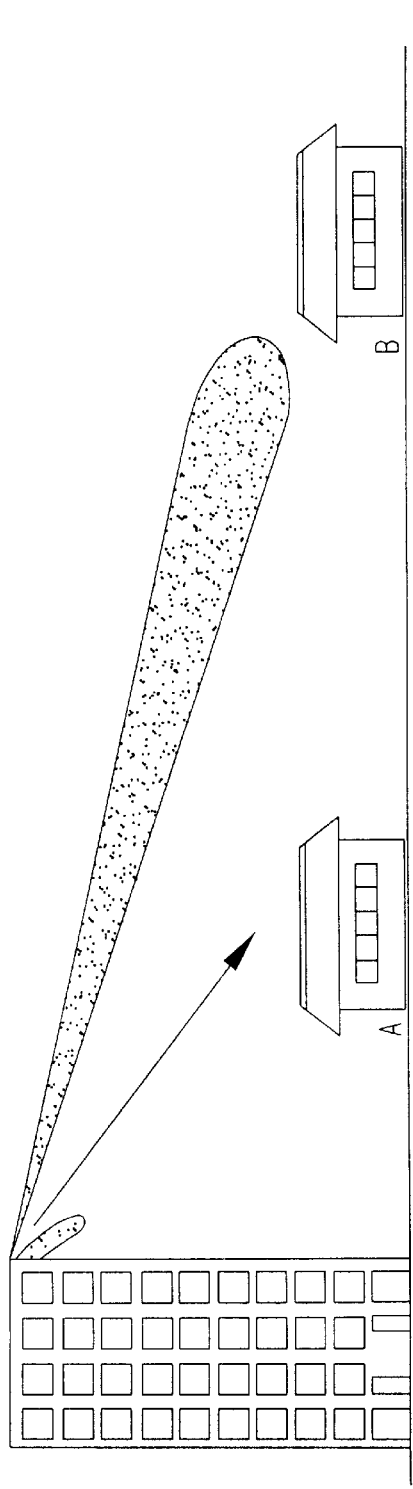
FIG. 28 shows the vertical radiation pattern of an unsuitable antenna.
Figure 29:
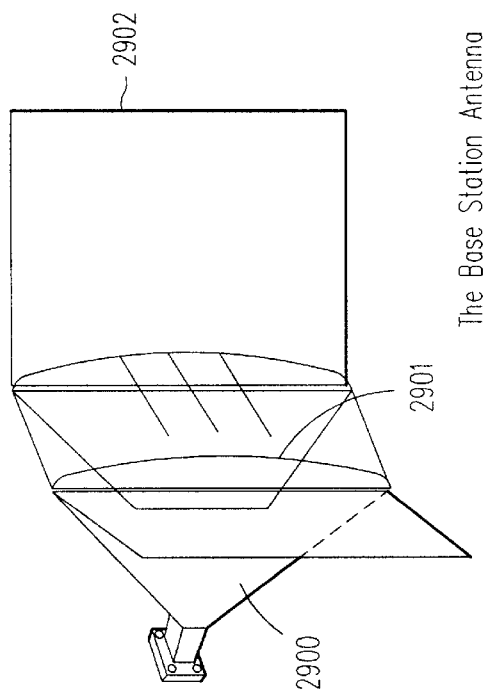
FIG. 29 shows a suitable base station antenna.

The Antenna needs to have a wide pattern in the horizontal dimension, such as 30, 60 or 90 degrees. In the vertical dimensions it may stay narrow, say a 12 degrees beam width, allowing it to improve the gain. However, nearby STs may fall into zeros in the radiation pattern, as shown in FIG. 28. This is avoided by allowing a small phase deviation in the horn aperture. A quarter wavelength seems a good compromise between main lobe beam spread and side lobes flattening. This reduction is accomplished by a choice of horn geometry or by intentional aberration in a dielectrical lens. A complete antenna is shown in FIG. 29. Its dimensions are about 10 to 20 cm in the longest direction, thus it is fairly small. The pyramidal horn 2900 may include a lens 2901 of near cylindrical shape and absorbing walls 2902, for adjusting beam width and allowing said radiation pattern to roll off in the horizontal dimension to avoid interference from a pattern 3 to ST 2700 shown in FIG. 27.

We claim:

1. A wireless metropolitan area network including:
   at least one base station having a plurality of sector antennas and a MAC controller, said station transmitting and receiving based on frequency division duplex (FDD) by means of said sector antennas;
   a plurality of subscriber terminals (STs) located within a sector area, each ST including:
      a directional antenna,
      a MAC processor, and
      circuitry for requesting bandwidth through a plurality of contention slots, said circuitry receiving transmission grants from said MAC controller and transmitting ATM cells including a MAC overhead and forward error correction per ATM cell to said base station;
   wherein each ST transmits one ATM-cell burst per ATM-type grant received from the base station, said grant information including a grant type, and said ATM-cell burst is received by the base station at a fixed time interval from the transmission of a corresponding grant from the base station to the ST.

2. The network of claim 1, wherein said MAC controller includes support for at least three types of grants.

3. The network of claim 1, wherein said MAC controller includes support for ATM cell slot, contention slot and admission slot grants.

4. The network of claim 1, further including bitmap slots.

5. A subscriber terminal (ST) for a wireless ATM metropolitan area network including:
- subscriber interfaces;
- a MAC framing and timing processor for transmission of ATM cells;
- forward error correction circuits; and
- a radio unit having an enclosure, mounting and alignment hardware, and an attached lens horn antenna,
- wherein the ST transmits one ATM-cell burst per ATM-type grant received from a base station, said grant information including a grant type, and said ATM-cell burst is received by the base station at a fixed time interval from the transmission of a corresponding grant from the base station to the ST.

6. The structure of claim 5, wherein said radio unit includes:
- a horn antenna wherein the horn structure is an integral part of the enclosure of said radio unit;
- a dielectric lens attached to said horn structure; and
- transmitter up conversion circuits and receiver down conversion circuits.

7. The structure of claim 6, further including a microprocessor having built-in ATM formatting capabilities.

8. A method of for transmitting constant bit rate ATM cells over a point-to-multipoint network including the steps of:
- (a) transmitting a grant to a subscriber terminal within a first fixed time window of the ideal transmission time for a virtual circuit; and
- (b) having said grant be used by said virtual circuit that also maintains a second time window only if said second time window has not expired.

9. The method of claim 8, wherein during step (b) if more than one virtual circuit exists on a subscriber terminal the grant is given to a virtual circuit with the oldest non-expired window.

10. The method of claim 9, further including the step of transmitting a time stamp with each of said ATM cells that has used said grant, wherein cell delay variation is reduced by adding a compensating delay to said cell upon arrival at the receiving end of said network.

11. The method of claim 8, wherein said first time window and said second time window are of equal time duration.

12. A method for scheduling transmission of ATM cells for CBR services from subscriber terminals to a base station over a point-to-multipoint network over a shared medium wherein said base station can grant the time slot of said transmission to any CBR virtual circuit, the method including the steps of:
- (a) creating grants for multiple CBR virtual circuits at the base station, wherein each grant is first scheduled for a time slot that minimizes cell delay variation for a corresponding virtual circuit; and
- (b) if two or more grants are scheduled for a first time slot, re-scheduling at least one of said grants to a second time slot;
- wherein each ST transmits one ATM-cell burst per ATM-type grant received from the base station, said grant information including a grant type, and said ATM-cell burst is received by the base station at a fixed time interval from the transmission of a corresponding grant from the base station to the ST.

13. The method of claim 12, further including the steps of:
- (d) transmitting a grant to a subscriber terminal within a first fixed time window of the ideal transmission time for a virtual circuit; and
- (e) having said grant given to said virtual circuit that also maintains a second time window only if said second time window has not expired.

* * * * *

UNITED STATES PATENT AND TRADEMARK OFFICE
CERTIFICATE OF CORRECTION

PATENT NO.    : 5,936,949  
DATED         : August 10, 1999  
INVENTOR(S)   : Pasternak, Eliezer, Feeney, Stuart M., Ben-Efraim, Gideon It is certified that error appears in the above-identified patent and that said Letters Patent is hereby corrected as shown below:

<u>Column 14,</u>
Line 57, delete "nuw" and insert -- new --.

Signed and Sealed this

Second Day of April, 2002

Attest:

JAMES E. ROGAN
*Attesting Officer*  *Director of the United States Patent and Trademark Office*